US011079933B2

(12) United States Patent
Kocienda et al.

(10) Patent No.: US 11,079,933 B2
(45) Date of Patent: Aug. 3, 2021

(54) METHOD, DEVICE, AND GRAPHICAL USER INTERFACE PROVIDING WORD RECOMMENDATIONS FOR TEXT INPUT

(71) Applicant: Apple Inc., Cupertino, CA (US)

(72) Inventors: Kenneth Kocienda, San Jose, CA (US); Greg Christie, San Jose, CA (US); Bas Ording, San Francisco, CA (US); Scott Forstall, Los Altos, CA (US); Richard Williamson, Los Gatos, CA (US); Jerome René Bellegarda, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/270,396

(22) Filed: Feb. 7, 2019

(65) Prior Publication Data

US 2019/0187892 A1 Jun. 20, 2019

Related U.S. Application Data

(60) Continuation of application No. 14/800,378, filed on Jul. 15, 2015, now abandoned, which is a
(Continued)

(51) Int. Cl.
*G06F 3/0488* (2013.01)
*G06F 3/0482* (2013.01)
(Continued)

(52) U.S. Cl.
CPC ........ *G06F 3/04886* (2013.01); *G06F 3/0237* (2013.01); *G06F 3/0482* (2013.01);
(Continued)

(58) Field of Classification Search
CPC .. G06F 3/0237; G06F 3/04817; G06F 3/0482; G06F 3/04842; G06F 3/04886; G06F 3/04895
See application file for complete search history.

(56) References Cited

U.S. PATENT DOCUMENTS 5,038,401 A 8/1991 Inotsume
5,053,758 A 10/1991 Cornett et al.
(Continued)

FOREIGN PATENT DOCUMENTS

CN 1834872 A 9/2006
EP 0880090 A2 11/1998
(Continued)

OTHER PUBLICATIONS

International Search Report and Written Opinion received for PCT Application No. PCT/US2015/023946, dated Oct. 12, 2015, 22 pages.
(Continued)

*Primary Examiner* — Kenneth Bukowski
(74) *Attorney, Agent, or Firm* — Dentons US LLP

(57) ABSTRACT

A portable electronic device having a touch screen display performs a set of operations, including displaying a plurality of key icons, each having an adjustable size hit region, and receiving a sequence of individual touch points input by a user on the touch screen display. The operations performed by the device further include processing the received individual touch points by: forming a user-input directed graph for the sequence of individual touch points received so far, determining a character corresponding to a last received individual touch point in accordance with the adjustable hit regions of the displayed key icons, displaying a sequence of characters corresponding to the sequence of individual touch points, and updating sizes of the adjustable hit regions for a plurality of the key icons in accordance with the sequence of individual touch points input by the user.

24 Claims, 15 Drawing Sheets

Related U.S. Application Data continuation of application No. 13/559,495, filed on Jul. 26, 2012, now Pat. No. 9,086,802, which is a division of application No. 12/165,554, filed on Jun. 30, 2008, now Pat. No. 8,232,973.

(60) Provisional application No. 61/010,619, filed on Jan. 9, 2008.

(51) Int. Cl.
 *G06F 3/0481* (2013.01)
 *G06F 3/0484* (2013.01)
 *G06F 3/023* (2006.01)
 *G06F 3/0489* (2013.01)

(52) U.S. Cl.
 CPC ...... *G06F 3/04817* (2013.01); *G06F 3/04842* (2013.01); *G06F 3/04895* (2013.01)

(56) References Cited

U.S. PATENT DOCUMENTS

| | | |
|---|---|---|
| 5,128,672 A | 7/1992 | Kaehler |
| 5,253,325 A | 10/1993 | Clark |
| 5,297,041 A | 3/1994 | Kushler et al. |
| 5,305,205 A | 4/1994 | Weber et al. |
| 5,565,894 A | 10/1996 | Bates et al. |
| 5,581,484 A | 12/1996 | Prince |
| 5,615,378 A | 3/1997 | Nishino et al. |
| 5,736,974 A | 4/1998 | Selker |
| 5,748,512 A | 5/1998 | Vargas |
| 5,748,927 A | 5/1998 | Stein et al. |
| 5,758,314 A | 5/1998 | Mckenna |
| 5,761,689 A | 6/1998 | Rayson et al. |
| 5,765,168 A | 6/1998 | Burrows |
| 5,774,834 A | 6/1998 | Visser |
| 5,778,405 A | 7/1998 | Ogawa |
| 5,797,008 A | 8/1998 | Burrows |
| 5,801,941 A | 9/1998 | Bertram |
| 5,805,165 A | 9/1998 | Thorne, III et al. |
| 5,805,911 A | 9/1998 | Miller |
| 5,818,437 A | 10/1998 | Grover et al. |
| 5,818,451 A | 10/1998 | Bertram et al. |
| 5,896,321 A | 4/1999 | Miller et al. |
| 5,943,443 A | 8/1999 | Itonori et al. |
| 5,953,541 A | 9/1999 | King et al. |
| 5,956,021 A | 9/1999 | Kubota et al. |
| 5,963,671 A | 10/1999 | Comerford et al. |
| 5,999,895 A | 12/1999 | Forest |
| 6,023,536 A | 2/2000 | Visser |
| 6,040,824 A | 3/2000 | Maekawa et al. |
| 6,049,326 A | 4/2000 | Beyda et al. |
| 6,073,036 A | 6/2000 | Heikkinen et al. |
| 6,094,197 A | 7/2000 | Buxton et al. |
| 6,169,538 B1 | 1/2001 | Nowlan et al. |
| 6,212,412 B1 | 4/2001 | Rogers et al. |
| 6,259,436 B1 | 7/2001 | Moon et al. |
| 6,271,835 B1 | 8/2001 | Hoeksma |
| 6,292,179 B1 | 9/2001 | Lee |
| 6,295,052 B1 | 9/2001 | Kato et al. |
| 6,298,321 B1 | 10/2001 | Karlov et al. |
| 6,307,548 B1 | 10/2001 | Flinchem et al. |
| 6,323,846 B1 | 11/2001 | Westerman et al. |
| 6,359,572 B1 | 3/2002 | Vale |
| 6,377,965 B1 | 4/2002 | Hachamovitch et al. |
| 6,401,060 B1 | 6/2002 | Critchlow et al. |
| 6,424,338 B1 | 7/2002 | Anderson |
| 6,426,761 B1 | 7/2002 | Kanevsky et al. |
| 6,434,581 B1 | 8/2002 | Forcier |
| 6,456,952 B1 | 9/2002 | Nathan |
| 6,469,722 B1 | 10/2002 | Kinoe et al. |
| 6,470,347 B1 | 10/2002 | Gillam |
| 6,570,557 B1 | 5/2003 | Westerman et al. |
| 6,573,844 B1 | 6/2003 | Venolia et al. |
| 6,597,345 B2 | 7/2003 | Hirshberg |
| 6,654,733 B1 | 11/2003 | Goodman et al. |
| 6,671,856 B1 | 12/2003 | Gillam |
| 6,675,169 B1 | 1/2004 | Bennett et al. |
| 6,677,932 B1 | 1/2004 | Westerman |
| 6,714,221 B1 | 3/2004 | Christie et al. |
| 6,760,580 B2 | 7/2004 | Robinson et al. |
| 6,795,059 B2 | 9/2004 | Endo |
| 6,801,190 B1 | 10/2004 | Robinson et al. |
| 6,801,659 B1 | 10/2004 | O'Dell |
| 6,803,905 B1 | 10/2004 | Capps et al. |
| 6,804,677 B2 | 10/2004 | Shadmon et al. |
| 6,857,800 B2 | 2/2005 | Zhang et al. |
| 6,926,609 B2 | 8/2005 | Martin |
| 6,938,220 B1 | 8/2005 | Shigematsu et al. |
| 7,030,863 B2 | 4/2006 | Longe et al. |
| 7,038,659 B2 | 5/2006 | Rajkowski |
| 7,057,607 B2 | 6/2006 | Mayoraz et al. |
| 7,075,512 B1 | 7/2006 | Fabre et al. |
| 7,096,432 B2 | 8/2006 | Huapaya et al. |
| 7,098,896 B2 | 8/2006 | Kushler et al. |
| 7,194,699 B2 | 3/2007 | Thomson et al. |
| 7,277,088 B2 | 10/2007 | Robinson et al. |
| 7,283,072 B1 | 10/2007 | Plachta et al. |
| 7,283,126 B2 | 10/2007 | Leung |
| 7,319,957 B2 | 1/2008 | Robinson et al. |
| 7,382,358 B2 | 6/2008 | Kushler et al. |
| 7,443,316 B2 | 10/2008 | Lim |
| 7,475,063 B2 | 1/2009 | Datta et al. |
| 7,477,240 B2 | 1/2009 | Yanagisawa |
| 7,487,147 B2 | 2/2009 | Bates et al. |
| 7,490,034 B2 | 2/2009 | Finnigan et al. |
| 7,502,017 B1 | 3/2009 | Ratzlaff et al. |
| 7,508,324 B2 | 3/2009 | Suraqui |
| 7,526,738 B2 | 4/2009 | Ording et al. |
| 7,565,380 B1 | 7/2009 | Venkatachary, Sr. |
| 7,584,093 B2 * | 9/2009 | Potter .................. G06F 17/2795 704/1 |
| 7,609,179 B2 | 10/2009 | Diaz-Gutierrez et al. |
| 7,614,008 B2 | 11/2009 | Ording |
| 7,619,677 B2 | 11/2009 | Matsuda et al. |
| 7,650,562 B2 | 1/2010 | Bederson et al. |
| 7,676,763 B2 | 3/2010 | Rummel |
| 7,679,534 B2 | 3/2010 | Kay et al. |
| 7,683,886 B2 | 3/2010 | Willey |
| 7,694,231 B2 | 4/2010 | Kocienda et al. |
| 7,707,026 B2 | 4/2010 | Liu |
| 7,712,053 B2 | 5/2010 | Bradford et al. |
| 7,725,838 B2 | 5/2010 | Williams |
| 7,778,818 B2 | 8/2010 | Longe et al. |
| 7,793,228 B2 | 9/2010 | Mansfield et al. |
| 7,797,269 B2 | 9/2010 | Rieman et al. |
| 7,809,719 B2 | 10/2010 | Furuuchi et al. |
| 7,809,744 B2 | 10/2010 | Nevidomski et al. |
| 7,880,730 B2 | 2/2011 | Robinson et al. |
| 7,941,762 B1 | 5/2011 | Tovino et al. |
| 7,957,955 B2 | 6/2011 | Christie et al. |
| 7,969,421 B2 | 6/2011 | Huh |
| 8,037,034 B2 | 10/2011 | Plachta et al. |
| 8,041,557 B2 | 10/2011 | Liu |
| 8,059,101 B2 | 11/2011 | Westerman et al. |
| 8,074,172 B2 | 12/2011 | Kocienda et al. |
| 8,090,571 B2 | 1/2012 | Elshishiny et al. |
| 8,112,529 B2 | 2/2012 | Van et al. |
| 8,136,052 B2 | 3/2012 | Shin et al. |
| 8,179,370 B1 | 5/2012 | Yamasani et al. |
| 8,232,973 B2 | 7/2012 | Kocienda et al. |
| 8,245,156 B2 | 8/2012 | Mouilleseaux et al. |
| 8,286,085 B1 | 10/2012 | Denise |
| 8,299,943 B2 | 10/2012 | Longe |
| 8,370,737 B2 | 2/2013 | Zahavi et al. |
| 8,423,916 B2 | 4/2013 | Chihara et al. |
| 8,542,206 B2 | 9/2013 | Westerman et al. |
| 8,601,389 B2 | 12/2013 | Schulz et al. |
| 8,645,825 B1 | 2/2014 | Cornea et al. |
| 8,661,340 B2 | 2/2014 | Goldsmith et al. |
| 8,671,343 B2 | 3/2014 | Oberstein |
| 8,706,750 B2 | 4/2014 | Hansson et al. |
| 8,825,484 B2 | 9/2014 | Yamada et al. |
| 8,843,845 B2 | 9/2014 | Ouyang et al. |

(56) References Cited

U.S. PATENT DOCUMENTS

| | | |
|---|---|---|
| 8,896,556 B2 | 11/2014 | Frazier et al. |
| 8,938,688 B2 | 1/2015 | Bradford et al. |
| 8,994,660 B2 | 3/2015 | Neels et al. |
| 9,007,311 B2 | 4/2015 | Kwak et al. |
| 9,021,380 B2 | 4/2015 | Zhai et al. |
| 9,046,928 B2 | 6/2015 | Kumhyr |
| 9,058,092 B2 | 6/2015 | Rogers |
| 9,086,802 B2 | 7/2015 | Kocienda et al. |
| 9,116,551 B2 | 8/2015 | Huang et al. |
| 9,250,797 B2 | 2/2016 | Roberts et al. |
| 9,310,889 B2 | 4/2016 | Griffin et al. |
| 9,405,740 B2 | 8/2016 | King et al. |
| 9,436,380 B2 | 9/2016 | Chmielewski et al. |
| 9,465,536 B2 | 10/2016 | Goldsmith et al. |
| 9,535,597 B2 | 1/2017 | Wong et al. |
| 9,557,913 B2 | 1/2017 | Griffin et al. |
| 9,557,916 B2 | 1/2017 | Robinson et al. |
| 10,037,139 B2 | 7/2018 | Pasquero et al. |
| 2001/0015718 A1 | 8/2001 | Hinckley et al. |
| 2002/0010726 A1 | 1/2002 | Rogson |
| 2002/0015024 A1 | 2/2002 | Westerman et al. |
| 2002/0015064 A1 | 2/2002 | Robotham et al. |
| 2002/0051018 A1 | 5/2002 | Yeh |
| 2002/0085037 A1 | 7/2002 | Leavitt et al. |
| 2002/0126097 A1 | 9/2002 | Savolainen |
| 2002/0135615 A1 | 9/2002 | Lang |
| 2002/0140679 A1 | 10/2002 | Wen |
| 2002/0140680 A1 | 10/2002 | Lu |
| 2002/0156615 A1 | 10/2002 | Takatsuka et al. |
| 2002/0167545 A1 | 11/2002 | Kang et al. |
| 2002/0191029 A1 | 12/2002 | Gillespie et al. |
| 2003/0024375 A1 | 2/2003 | Sitrick |
| 2003/0041147 A1 | 2/2003 | Van et al. |
| 2003/0063073 A1 | 4/2003 | Geaghan et al. |
| 2003/0090467 A1 | 5/2003 | Hohl et al. |
| 2003/0100965 A1 | 5/2003 | Sitrick et al. |
| 2003/0149978 A1 | 8/2003 | Plotnick |
| 2003/0159113 A1 | 8/2003 | Bederson et al. |
| 2003/0189553 A1 | 10/2003 | Goren |
| 2003/0193481 A1 | 10/2003 | Sokolsky |
| 2003/0197736 A1 | 10/2003 | Murphy |
| 2003/0204392 A1 | 10/2003 | Finnigan et al. |
| 2003/0216913 A1 | 11/2003 | Keely et al. |
| 2003/0229607 A1 | 12/2003 | Zellweger et al. |
| 2004/0009788 A1 | 1/2004 | Mantyjarvi et al. |
| 2004/0070567 A1 | 4/2004 | Longe et al. |
| 2004/0095395 A1 | 5/2004 | Kurtenbach |
| 2004/0135774 A1 | 7/2004 | La Monica |
| 2004/0140956 A1 | 7/2004 | Kushler et al. |
| 2004/0155869 A1* | 8/2004 | Robinson ............. G06F 3/0238 345/168 |
| 2004/0157586 A1 | 8/2004 | Robinson et al. |
| 2004/0160419 A1 | 8/2004 | Padgitt |
| 2004/0165924 A1 | 8/2004 | Griffin |
| 2004/0178994 A1 | 9/2004 | Kairis, Jr. |
| 2004/0183833 A1 | 9/2004 | Chua |
| 2004/0196256 A1 | 10/2004 | Wobbrock et al. |
| 2004/0218963 A1 | 11/2004 | Van Diepen et al. |
| 2004/0243389 A1 | 12/2004 | Thomas et al. |
| 2004/0261021 A1 | 12/2004 | Mittal et al. |
| 2005/0024341 A1 | 2/2005 | Gillespie et al. |
| 2005/0027622 A1 | 2/2005 | Walker et al. |
| 2005/0057498 A1 | 3/2005 | Gentle |
| 2005/0093826 A1 | 5/2005 | Huh |
| 2005/0099398 A1* | 5/2005 | Garside ............ G06F 3/04883 345/173 |
| 2005/0114324 A1 | 5/2005 | Mayer |
| 2005/0116927 A1 | 6/2005 | Voelckers |
| 2005/0131687 A1 | 6/2005 | Sorrentino |
| 2005/0162395 A1 | 7/2005 | Unruh |
| 2005/0169527 A1 | 8/2005 | Longe et al. |
| 2005/0190970 A1 | 9/2005 | Griffin |
| 2005/0193351 A1 | 9/2005 | Huoviala |
| 2005/0216331 A1 | 9/2005 | Ahrens et al. |
| 2005/0246365 A1 | 11/2005 | Lowles et al. |
| 2005/0253816 A1 | 11/2005 | Himberg et al. |
| 2005/0253818 A1 | 11/2005 | Nettamo |
| 2005/0278647 A1 | 12/2005 | Leavitt et al. |
| 2005/0283364 A1 | 12/2005 | Longe et al. |
| 2005/0283726 A1 | 12/2005 | Lunati |
| 2006/0004744 A1 | 1/2006 | Nevidomski et al. |
| 2006/0007174 A1 | 1/2006 | Shen |
| 2006/0044278 A1 | 3/2006 | Fux et al. |
| 2006/0052885 A1 | 3/2006 | Kong |
| 2006/0053387 A1 | 3/2006 | Ording |
| 2006/0062461 A1 | 3/2006 | Longe et al. |
| 2006/0066590 A1 | 3/2006 | Ozawa et al. |
| 2006/0085757 A1 | 4/2006 | Andre et al. |
| 2006/0117067 A1 | 6/2006 | Wright et al. |
| 2006/0152496 A1 | 7/2006 | Knaven |
| 2006/0161846 A1 | 7/2006 | Van Leeuwen |
| 2006/0181519 A1 | 8/2006 | Vernier et al. |
| 2006/0190256 A1 | 8/2006 | Stephanick et al. |
| 2006/0206454 A1 | 9/2006 | Forstall et al. |
| 2006/0241944 A1 | 10/2006 | Potter et al. |
| 2006/0246955 A1 | 11/2006 | Nirhamo et al. |
| 2006/0247915 A1 | 11/2006 | Bradford et al. |
| 2006/0265208 A1 | 11/2006 | Assadollahi |
| 2006/0265648 A1 | 11/2006 | Rainisto et al. |
| 2006/0274051 A1 | 12/2006 | Longe et al. |
| 2006/0288024 A1 | 12/2006 | Braica |
| 2006/0293880 A1 | 12/2006 | Elshishiny et al. |
| 2007/0024736 A1 | 2/2007 | Matsuda et al. |
| 2007/0040813 A1 | 2/2007 | Kushler et al. |
| 2007/0046641 A1* | 3/2007 | Lim ................. G06F 3/0237 345/173 |
| 2007/0061753 A1 | 3/2007 | Ng et al. |
| 2007/0061754 A1 | 3/2007 | Ardhanari et al. |
| 2007/0067272 A1 | 3/2007 | Flynt et al. |
| 2007/0130128 A1 | 6/2007 | Garg et al. |
| 2007/0143262 A1 | 6/2007 | Kasperski |
| 2007/0152978 A1 | 7/2007 | Kocienda et al. |
| 2007/0156747 A1 | 7/2007 | Samuelson et al. |
| 2007/0174387 A1 | 7/2007 | Jania et al. |
| 2007/0180392 A1 | 8/2007 | Russo |
| 2007/0198566 A1 | 8/2007 | Sustik |
| 2007/0229323 A1 | 10/2007 | Plachta et al. |
| 2007/0229476 A1 | 10/2007 | Huh |
| 2007/0257896 A1 | 11/2007 | Huh |
| 2007/0260595 A1 | 11/2007 | Beatty et al. |
| 2007/0279711 A1 | 12/2007 | King et al. |
| 2007/0285958 A1 | 12/2007 | Plachta et al. |
| 2007/0288449 A1 | 12/2007 | Datta et al. |
| 2008/0036743 A1 | 2/2008 | Westerman et al. |
| 2008/0059876 A1 | 3/2008 | Hantler et al. |
| 2008/0072156 A1 | 3/2008 | Sitrick |
| 2008/0109401 A1 | 5/2008 | Sareen et al. |
| 2008/0114591 A1* | 5/2008 | Williamson .......... G06F 3/0237 704/10 |
| 2008/0167858 A1 | 7/2008 | Christie et al. |
| 2008/0168366 A1 | 7/2008 | Kocienda et al. |
| 2008/0177717 A1 | 7/2008 | Kumar et al. |
| 2008/0195388 A1* | 8/2008 | Bower ................. G06F 3/0237 704/243 |
| 2008/0209358 A1 | 8/2008 | Yamashita |
| 2008/0259022 A1 | 10/2008 | Mansfield et al. |
| 2008/0266261 A1 | 10/2008 | Idzik |
| 2008/0310723 A1 | 12/2008 | Manu et al. |
| 2008/0316183 A1 | 12/2008 | Westerrnan et al. |
| 2009/0051661 A1 | 2/2009 | Kraft et al. |
| 2009/0058823 A1 | 3/2009 | Kocienda |
| 2009/0119289 A1 | 5/2009 | Gibbs et al. |
| 2009/0174667 A1 | 7/2009 | Kocienda et al. |
| 2009/0193332 A1 | 7/2009 | Lee |
| 2009/0193361 A1 | 7/2009 | Lee et al. |
| 2009/0249198 A1 | 10/2009 | Davis et al. |
| 2009/0284471 A1 | 11/2009 | Longe et al. |
| 2009/0319172 A1 | 12/2009 | Almeida et al. |
| 2009/0327977 A1 | 12/2009 | Bachfischer et al. |
| 2010/0023318 A1 | 1/2010 | Lemoine |
| 2010/0036655 A1 | 2/2010 | Cecil et al. |
| 2010/0177056 A1 | 7/2010 | Kocienda et al. |
| 2010/0188357 A1 | 7/2010 | Kocienda et al. |
| 2010/0188358 A1 | 7/2010 | Kocienda et al. |

(56) References Cited

U.S. PATENT DOCUMENTS

| | | |
|---|---|---|
| 2010/0192086 A1 | 7/2010 | Kocienda et al. |
| 2010/0235780 A1 | 9/2010 | Westerrman et al. |
| 2010/0287486 A1 | 11/2010 | Coddington |
| 2010/0325588 A1 | 12/2010 | Reddy et al. |
| 2010/0333030 A1 | 12/2010 | Johns |
| 2011/0004849 A1 | 1/2011 | Oh |
| 2011/0183720 A1 | 7/2011 | Dinn |
| 2011/0201387 A1 | 8/2011 | Paek et al. |
| 2011/0202876 A1 | 8/2011 | Badger et al. |
| 2011/0209098 A1 | 8/2011 | Hinckley et al. |
| 2012/0036469 A1 | 2/2012 | Suraqui |
| 2012/0047135 A1 | 2/2012 | Hansson et al. |
| 2012/0079373 A1 | 3/2012 | Kocienda et al. |
| 2012/0079412 A1 | 3/2012 | Kocienda et al. |
| 2012/0119997 A1 | 5/2012 | Gutowitz |
| 2012/0136897 A1* | 5/2012 | Kawauchi ............ G06F 3/0237 |
| | | 707/780 |
| 2012/0167009 A1 | 6/2012 | Davidson et al. |
| 2012/0239395 A1 | 9/2012 | Foo |
| 2012/0240036 A1 | 9/2012 | Howard et al. |
| 2013/0002553 A1 | 1/2013 | Colley |
| 2013/0036387 A1 | 2/2013 | Murata |
| 2013/0104068 A1 | 4/2013 | Murphy et al. |
| 2013/0125037 A1 | 5/2013 | Pasquero et al. |
| 2013/0187858 A1 | 7/2013 | Griffin et al. |
| 2013/0285927 A1 | 10/2013 | Pasquero et al. |
| 2013/0339283 A1 | 12/2013 | Grieves et al. |
| 2014/0002363 A1 | 1/2014 | Griffin et al. |
| 2014/0028571 A1 | 1/2014 | St. Clair |
| 2014/0063067 A1 | 3/2014 | Compton et al. |
| 2014/0085311 A1 | 3/2014 | Gay et al. |
| 2014/0176776 A1 | 6/2014 | Morita |
| 2014/0195979 A1 | 7/2014 | Branton et al. |
| 2014/0310639 A1 | 10/2014 | Zhai et al. |
| 2014/0317547 A1 | 10/2014 | Bi et al. |
| 2015/0121285 A1 | 4/2015 | Eleftheriou et al. |
| 2015/0142602 A1 | 5/2015 | Williams et al. |
| 2015/0281788 A1 | 10/2015 | Noguerol et al. |
| 2015/0317078 A1 | 11/2015 | Kocienda et al. |
| 2015/0331605 A1 | 11/2015 | Park et al. |
| 2015/0347007 A1 | 12/2015 | Chaudhri et al. |
| 2015/0347379 A1 | 12/2015 | Chaudhri et al. |
| 2015/0378982 A1 | 12/2015 | Mckenzie et al. |
| 2016/0070441 A1 | 3/2016 | Paek et al. |
| 2016/0139805 A1 | 5/2016 | Kocienda et al. |
| 2017/0024126 A1 | 1/2017 | Goldsmith et al. |
| 2019/0147035 A1 | 5/2019 | Chaudhri et al. |
| 2020/0379638 A1 | 12/2020 | Zhu et al. |

FOREIGN PATENT DOCUMENTS

| | | |
|---|---|---|
| EP | 1271295 A2 | 1/2003 |
| EP | 1674976 A2 | 6/2006 |
| GB | 2332293 A | 6/1999 |
| GB | 2337349 A | 11/1999 |
| GB | 2351639 A | 1/2001 |
| GB | 2380583 A | 4/2003 |
| JP | 8-249122 A | 9/1996 |
| JP | 9-81320 A | 3/1997 |
| JP | 11-53093 A | 2/1999 |
| JP | 11-305933 A | 11/1999 |
| JP | 2000-029630 A | 1/2000 |
| JP | 2001-521793 A | 11/2001 |
| JP | 2002-518721 A | 6/2002 |
| JP | 2002-222039 A | 8/2002 |
| JP | 2003-216312 A | 7/2003 |
| JP | 2005-92256 A | 4/2005 |
| WO | 1998/033111 A1 | 7/1998 |
| WO | 2000/038041 A1 | 6/2000 |
| WO | 2000/038042 A1 | 6/2000 |
| WO | 2003/098417 A2 | 11/2003 |
| WO | 2004/051392 A2 | 6/2004 |
| WO | 2005/006442 A1 | 1/2005 |
| WO | 2005/008899 A1 | 1/2005 |
| WO | 2006/003590 A2 | 1/2006 |
| WO | 2006/115946 A2 | 11/2006 |
| WO | 2007/068505 A1 | 6/2007 |

OTHER PUBLICATIONS

Anonymous, "Swipe to Edit Using BetterTouchTool: Mac Automation Tips", Mac Automation Tips , XP55217837 , Retrieved from the Internet: URL:https:jjmacautomationtips.wordpress.com/2011/03/11/swipe-to-edit-using-bettertouchtool/, Mar. 11, 2011, 1 page.

Chavda, Prekesh, "Swipe to Edit", Dribbble, XP55217832, and retrieved from the Internet: URL: https://dribbble.comjshots/1320750-Swipe-to-Edit-animation, Nov. 21, 2013, 7 pages.

Decision to Grant received for Chinese Patent Application No. 201210377992.0, dated May 6, 2015, 4 pages (Official Copy only) (See Communication under 37 CFR § 1.98(a) (3)).

Final Office Action received for U.S Appl. No. 14/502,711, dated Sep. 22, 2017, 27 pages.

Final Office Action received for U.S. Appl. No. 12/207,429, dated Nov. 28, 2011, 11 pages.

Final Office Action received for U.S. Appl. No. 12/207,429, dated Oct. 25, 2012, Oct. 25, 2012, 8 pages.

Final Office Action received for U.S. Appl. No. 14/502,711, dated Apr. 12, 2017, 29 pages.

Final Office Action received for U.S. Appl. No. 14/503,147, dated Jun. 15, 2017, 18 pages.

Final Office Action received for U.S. Appl. No. 15/288,579, dated Jan. 7, 2019, 12 pages.

International Preliminary Report on Patentability received for PCT Application No. PCT/US2015/023946, dated Dec. 15, 2016, 17 pages.

Minutes of the Oral Proceedings received for European Patent Application No. 15716372.6, dated Feb. 21, 2019, 6 pages.

Non Final Office Action received for U.S. Appl. No. 14/502,711, dated Apr. 26, 2018, 21 pages.

Non Final Office Action received for U.S. Appl. No. 14/503,147, dated Nov. 2, 2016, 21 pages.

Non Final Office Action Received for U.S. Appl. No. 14/502,711, dated Nov. 21, 2016, 23 pages.

Non-Final Office Action received for U.S. Appl. No. 12/207,429, dated Jun. 21, 2013, 8 pages.

Non-Final Office Action received for U.S. Appl. No. 12/207,429, dated Jun. 9, 2011, 10 pages.

Non-Final Office Action received for U.S. Appl. No. 12/207,429, dated Mar. 30, 2012, Mar. 30, 2012, 9 pages.

Non-Final Office Action received for U.S. Appl. No. 12/976,834, dated Mar. 12, 2013, 17 pages.

Non-Final Office Action received for U.S. Appl. No. 15/288,579, dated Apr. 4, 2018, 6 pages.

Notice of Allowance received for U.S. Appl. No. 12/207,429, dated Oct. 8, 2013, Oct. 8, 2013, 9 pages.

Notice of Allowance received for U.S. Appl. No. 14/187,176, dated Jul. 29, 2016, 7 pages.

Notice of Allowance received for U.S. Appl. No. 14/502,711, dated Sep. 28, 2018, 9 pages.

Notice of Allowance received for U.S. Appl. No. 14/503,147, dated Jan. 28, 2019, 7 pages.

Notice of Allowance received for U.S. Appl. No. 14/503,147, dated Sep. 12, 2018, 7 pages.

Office Action received for Chinese Patent Application No. 201210377992.0, dated Sep. 3, 2014, 9 pages (3 pages of English Translation and 6 pages of Official Copy).

Office Action received for European Patent Application No. 15716372.6, dated Nov. 15, 2017, 8 pages.

Pogue, D., "iPhone:The Missing Manual", Second Edition, O'Reilly Media, Aug. 2008, pp. 19-26.

Summons to Attend Oral Proceedings received for European Patent Application No. 15716372.6, dated Jul. 13, 2018, 9 pages.

Intention to Grant received for European Patent Application No. 157165372.6, dated Apr. 3, 2019, 7 pages.

Minutes of the oral proceedings received for European Patent Application No. 15716372.6, dated Mar. 29, 2019, 9 pages.

(56) References Cited

OTHER PUBLICATIONS

Advisory Action received for U.S. Appl. No. 15/288,579, dated May 2, 2019, 5 pages.
Call Centre, "Word Prediction", The CALL Centre & Scottish Executive Education Dept, 1999, pp. 63-73.
Casario, M., "Hands on Macromed!a World: Touch Screen Keypad for Mobile Phone by DoCoMo", available at <http://casario.blogs.com/mmworld/2005/10/touch_screen_ke.html>, retrieved on Nov. 18, 2005, 1 page.
Centroid, available at <http://faculty.evansville.edu/ck6/tcenters/class/centroid.html>, Apr. 28, 2006, 1 page.
Centroid, available at http://www.pballew.net/centroid.html, Apr. 28, 2006, 3 pages.
Compare Keyboards with the Keyboard Compatibility Chart, Learn more About Alternative Keyboards, Solutions for Humans, available at <http://www.keyalt.com/kkeybrdp.htm>, Dec. 8, 2005, 5 pages.
Day, B., "Will Cell Phones Render iPods Obsolete?", available at <http://weblogs.iavanet/pub/wig/883>, Dec. 12, 2005 ,3 pages.
Devices, Technology Loan Catalog, available at <http://www.tsbvi.edu/outreach/techioan/catalog.html>, retrieved on Dec. 8, 2005, 10 pages.
Dyslexic.com, "AlphaSmart 3000 with CoWriter SmartApplet: Don Johnston Special Needs", available at <http://www.dyslexic.com/procuts.php?catid-2&pid=465&PHPSESSID=2511b800000f7da>, retrieved on Dec. 6, 2005, pp. 1-13.
Fastap Keypads Redefine Mobile Phones, DigitWireless, available at <http://www.digitwireless.com>, retrieved on Nov. 18, 2005, 10 pages.
Fastap, DigitWireless, available at <http://www.digitwireless.com/about/faq.html>, Dec. 6, 2005, 5 pages.
Final Office Action received for U.S. Appl. No. 11/459,615, dated Dec. 8, 2009, 12 pages.
Final Office Action received for U.S. Appl. No. 11/549,624, dated Apr. 10, 2009, 9 pages.
Final Office Action received for U.S. Appl. No. 11/549,624, dated Feb. 1, 2010, 9 pages.
Final Office Action received for U.S. Appl. No. 11/620,641, dated Jun. 25, 2010, 31 pages.
Final Office Action received for U.S. Appl. No. 11/620,642, dated Nov. 29, 2010, 14 pages.
Final Office Action received for U.S. Appl. No. 11/961,663 dated Mar. 17, 2011, 24 pages.
Final Office Action received for U.S. Appl. No. 12/505,382, dated Jul. 9, 2012, 35 pages.
Final Office Action received for U.S. Appl. No. 12/505,382, dated May 3, 2012, 27 pages.
Final Office Action received for U.S. Appl. No. 13/559,495, dated Sep. 8, 2014, 7 pages.
Final Office Action received for U.S. Appl. No. 14/800,378, dated Sep. 7, 2018, 18 pages.
Final Office Action received for U.S. Appl. No. 15/003,773, dated May 10, 2018, 12 pages.
Four-Button Keyboard, WikiPodlinux, available at <http://ipodlinux.org/Four_Button_Keyboard>, retrieved on Dec. 5, 2005>, 2 pages.
Glossary of Adaptive Technologies: Word Prediction, available at <http://www.utoronto.ca/atrc/reference/techwordpred.html>, retrieved on Dec. 6, 2005, pp. 1-5.
Hardy, Ed, "Apple Adds iTunes Wi-Fi Music Store to iPhone", Brighthand, available online at <http://www.brighthand.com/printArticle.asp?newsID=13379>, Sep. 28, 2007, 1 page.
International Preliminary Report on Patentability received for PCT Patent Application No. PCT/US2007/060119, dated Jul. 8, 2008, 13 pages.
International Preliminary Report on Patentability received for PCT Patent Application No. PCT/US2007/088872, dated Jul. 7, 2009, 7 pages.
International Preliminary Report on Patentability received for PCT Patent Application No. PCT/US2007/088873, dated Jul. 7, 2009, 6 pages.

International Search Report and Written Opinion received for PCT Patent Application No. PCT/US2007/060119, dated Apr. 11, 2008, 18 pages.
International Search Report and Written Opinion received for PCT Patent Application No. PCT/US2007/088872, dated May 8, 2008, 8 pages.
International Search Report and Written Opinion received for PCT Patent Application No. PCT/US2007/088873, dated May 8, 2008, 7 pages.
International Search Report and Written Opinion received for PCT Patent Application No. PCT/US2007/088904, dated Sep. 15, 2008, 17 pages.
International Search Report and Written Opinion received in International Application No. PCT/US2008/050426, dated Jun. 13, 2008, 10 pages.
Introducing the Ultimate Smartphone Keypad, Delta II™ Keypads, available at <http://www.chicagologic.com>, retrieved on Nov. 18, 2005, 2 pages.
Invitation to Pay Additional Fees received for PCT Patent Application No. PCT/US2007/060119, dated Jan. 2, 2008, 9 pages.
Invitation to Pay Additional Fees received for PCT Patent Application No. PCT/US2007/088904, dated Jun. 23, 2008, 8 pages.
LG Develops New Touch Pad Cell Phones, Textually, available at <http://textually.ora/textually/archives/2005/06/009903.html>, retrieved on Nov. 18, 2005, 1 page.
Mactech, "KeyStrokes 3.5 for Mac OS X Boosts Word Prediction", available at <http://www.mactech.com/news/?p=1007129>, retrieved on Jan. 7, 2008, pp. 1-3.
Masui, Toshiyuki, "POBox: An Efficient Text Input Method for Handheld and Ubiquitous Computers", Proceedings of the 1st International Symposium on Handheld and Ubiquitous Computing, 1999, 12 pages.
Microsoft New-Smart Phone Interface: Your Thumb, Textually, available at <htto://www.textuallv.org>, retrieved on Nov. 18, 2005, 2 pages.
Mobile Tech News, T9 Text Input Software Updated, available at <http://www.mobiletechnews.com/info/2004/11/23/122155.html>, Nov. 23, 2004, 4 pages.
NCIP, "NCIP Library: Word Prediction Collection", available at <http://www2.edc.org/ncip/library/wp/toc.htm>, 1998, 4 pages.
NCIP, "What is Word Prediction?", available at <http://www2.edc.org/NCIP/library/wp/what_is.htm>, 1998 ,2 pages.
Non Final Office Action received for U.S. Appl. No. 11/620,641, dated Nov. 20, 2009, 20 pages.
Non Final Office Action received for U.S. Appl. No. 90/012,892, dated Aug. 5, 2014, 54 pages.
Non Final Office Action received for U.S. Appl. No. 90/012,892, dated Mar. 27, 2015, 102 pages.
Non-Final Office Action received for U.S. Appl. No. 12/727,217, dated May 11, 2012, 22 pages.
Non-Final Office Action received for U.S. Appl. No. 11/228,737, dated Mar. 19, 2009, 17 pages.
Non-Final Office Action received for U.S. Appl. No. 11/459,606, dated May 28, 2009, 19 pages.
Non-Final Office Action received for U.S. Appl. No. 11/459,615, dated Apr. 13, 2010, 10 pages.
Non-Final Office Action received for U.S. Appl. No. 11/459,615, dated May 22, 2009, 10 pages.
Non-Final Office Action received for U.S. Appl. No. 11/549,624, dated Jul. 22, 2009, 9 pages.
Non-Final Office Action received for U.S. Appl. No. 11/549,624, dated Sep. 30, 2008, 8 pages.
Non-Final Office Action received for U.S. Appl. No. 11/620,642, dated Feb. 18, 2011, 16 pages.
Non-Final Office Action received for U.S. Appl. No. 11/620,642, dated Mar. 30, 2010, 10 pages.
Non-Final Office Action received for U.S. Appl. No. 11/961,663, dated dated Nov. 18, 2010, 22 pages.
Non-Final Office Action received for U.S. Appl. No. 12/165,554, dated Nov. 21, 2011, 12 pages.
Non-Final Office Action received for U.S. Appl. No. 12/505,382, dated Jan. 5, 2012, 32 pages.

(56) References Cited

OTHER PUBLICATIONS

Non-Final Office Action received for U.S. Appl. No. 12/727,219, dated Feb. 17, 2012, 12 pages.
Non-Final Office Action received for U.S. Appl. No. 12/727,220, dated Feb. 16, 2012, 15 pages.
Non-Final Office Action received for U.S. Appl. No. 12/727,221, dated Feb. 16, 2012, 18 pages.
Non-Final Office Action received for U.S. Appl. No. 13/220,202, dated Jun. 12, 2014, 13 pages.
Non-Final Office Action received for U.S. Appl. No. 13/310,586, dated Jul. 09, 2015, 10 pages.
Non-Final Office Action received for U.S. Appl. No. 13/310,592, dated Jun. 22, 2015, 9 pages.
Non-Final Office Action received for U.S. Appl. No. 13/559,495, dated Dec. 16, 2013, 6 pages.
Non-Final Office Action received for U.S. Appl. No. 13/559,495, dated Dec. 7, 2012, 10 pages.
Non-Final Office Action received for U.S. Appl. No. 14/800,378, dated Feb. 23, 2018, 10 pages.
Non-Final Office Action received for U.S. Appl. No. 15/003,773, dated Oct. 5, 2017, 10 pages.
Notice of Allowance received for U.S. Appl. No. 13/310,586, dated Sep. 14, 2015, 9 pages.
Notice of Allowance received for U.S. Appl. No. 11/459,606, dated Dec. 18, 2009, 7 pages.
Notice of Allowance received for U.S. Appl. No. 11/549,624, dated Jun. 3, 2010, 6 pages.
Notice of Allowance received for U.S. Appl. No. 11/620,641, dated Apr. 13, 2011, 6 pages.
Notice of Allowance received for U.S. Appl. No. 11/620,641, dated Mar. 18, 2011, 12 pages.
Notice of Allowance received for U.S. Appl. No. 11/620,642, dated Oct. 24, 2011, 8 pages.
Notice of Allowance received for U.S. Appl. No. 12/165,554, dated Apr. 2, 2012, 9 pages.
Notice of Allowance received for U.S. Appl. No. 13/220,202, dated Nov. 25, 2014, 8 pages.
Notice of Allowance received for U.S. Appl. No. 13/310,592, dated Jul. 15, 2015, 8 pages.
Notice of Allowance received for U.S. Appl. No. 13/559,495, dated Aug. 15, 2013, 6 pages.
Notice of Allowance received for U.S. Appl. No. 13/559,495, dated Dec. 12, 2014, 5 pages.
Notice of Allowance received for U.S. Appl. No. 13/559,495, dated Jun. 25, 2013, 6 pages.
Notice of Allowance received for U.S. Appl. No. 13/559,495, dated Mar. 13, 2015, 5 pages.
Notice of Intent received for U.S. Appl. No. 90/012,892, dated Sep. 17, 2015, 10 pages.
Office Action received for Australian Patent Application No. 2007342164, dated Apr. 1, 2010, 2 pages.
Office Action received for Chinese Patent Application No. 200780006621.9, dated Aug. 16, 2010, 4 pages.
Office Action received for Chinese Patent Application No. 200780052020.1, dated Nov. 25, 2010, 14 pages.
Office Action received for European Patent Application No. 07709955.4, dated Jul. 31, 2009, 6 pages.
Office Action Received for European Patent Application No. 07709955.4, dated Oct. 10, 2008, 5 pages.
Office Action received for European Patent Application No. 07869922.0, dated Dec. 7, 2010, 5 pages.
Office Action received for European Patent Application No. 07869922.0, dated May 26, 2010, 5 pages.
Office Action received for European Patent Application No. 07869923.8, dated May 26, 2010, 4 pages.
Office Action received for Korean Patent Application No. 10-2008-7019114, dated Aug. 31, 2010, 4 pages.
Office Action received for Taiwan Patent Application No. 097100079, dated Apr. 17, 2012 34 pages.
Office Action received in Japanese Patent Application No. 2008-549646, dated Apr. 27, 2011, 4 pages.
O'Neal, "Smart Phones with Hidden Keyboards", available at <http://msc.com/4250-6452_16-6229969-1.html>, Nov. 18, 2005, 3 pages.
P900 User Guide, Sony Ericsson Mobile Communications AB, XP002479719, available at <http://www.sonyericcson.com/downloads/P900_UG_Rlb_EN.pdf>, 98 pages.
Plaisant, C., "Touchscreen Toggle Design", available at <http://www.youtube.com/watch?v=wFWbdxicvK0>, retrieved on Nov. 15, 2013, 2 pages.
Pogue, David, "iPhone: The Missing Manual", Aug. 2007, 306 pages.
Samsung Releases Keyboard Phone in US, Textually, available at <http://www.textually.ora/textually/archives/2005/11/010482.htm>, retrieved on Nov. 18, 2005, 1 page.
Sears, et al., "Data Entry for Mobile Devices Using Soft Keyboards: Understanding the Effects of Keyboard Size and User Tasks", Abstract, Int'l Journal of Human-Computer Interaction, vol. 16, No. 2, 1 page.
Summons to Attend Oral Proceedings received for European Patent Application No. 07709955.4, dated May 11, 2010, 8 pages.
T9® Text Input for Keypad Devices, Available at <http://tegic.com>, 1 page.
Text Input (legacy), WikiPodlinux, available at <http://ipodlinux.org/Text_Input_%28legacy%29>, retrieved on Dec. 5, 2005, 8 pages.
Text Input Concepts, WikiPodlinux, available at <http:l/web.archive.ora/web/20051211165254/http:l/ipodlinux.ora/Text_Input_Concepts>, 3 pages.
Text Input Methods, WikiPodlinux, available at <http://ipodlinux.org/Text_Input_Methods>, retrieved on Dec. 5, 2005, 5 pages.
Third Party Rejection received for U.S. Appl. No. 90/012,892, dated Jun. 14, 2013, 681 pages.
You Heard of Touch Screens Now Check Out Touch Keys, Phoneyworld, available at <http://www.phonevworld.com>, retrieved on Nov. 18, 2005, 2 pages.
Decision to Grant received for European Patent Application No. 15716372.6, dated Aug. 16, 2019, 2 pages.
Applicant-Initiated Interview Summary received for U.S. Appl. No. 16/245,140, dated Sep. 16, 2020, 6 pages.
Non-Final Office Action received for U.S. Appl. No. 16/245,140, dated Jun. 2, 2020, 23 pages.
Applicant-Initiated Interview Summary received for U.S. Appl. No. 16/245,140, dated Feb. 1, 2021, 4 pages.
Final Office Action received for U.S. Appl. No. 16/245,140, dated Feb. 11, 2021, 23 pages.
Non-Final Office Action received for U.S. Appl. No. 16/245,140, dated Oct. 30, 2020, 20 pages.

\* cited by examiner

| | | | | | | | | |
|---|---|---|---|---|---|---|---|---|
| Input: | r | h | e | a | t | r | e | |
| Candidate Word: | t | h | e | a | t | e | r | |
| Score: | 0.5N | N | N | N | N | 0.5N | 0.5N | = 5.5N |
| Candidate Word: | t | h | r | e | a | t | s | |
| Score: | 0.5N | N | 0.5N | 0.25N | 0.25N | 0.5N | 0.5N | = 3.5N |
| Candidate Word: | t | h | e | r | e | | | |
| Score: | 0.5N | N | N | 0.25N | 0.25N | 0 | 0 | = 3N |

FIG. 7A

Input: | t | h | a | e | t | e | r |

Candidate Word: | t | h | e | a | t | e | r |

Score:  N   N   0.25N   0.25N   N   N   N   = 5.5N

Plus bonus for difference in 1 set of transposed characters:   P   = 5.5N + P

FIG. 7B

Input: | t | h | e | s | t | e | r |

Candidate Word: | t | h | e | a | t | e | r |

Score:  N   N   N   0.5N   N   N   N   = 6.5N

Plus bonus for difference in only 1 character:   Q   = 6.5N + Q

FIG. 7C

R — h — e — s — u — s $P_{touch}(r)P_{usage}(r)$   $P_{touch}(h)P_{usage}(h)$   $P_{touch}(e)P_{usage}(e)$ T — h — e $P_{touch}(t)P_{usage}(t)$   $P_{touch}(h)P_{usage}(h)$   $P_{touch}(e)P_{usage}(e)$

1002 — Display a plurality of key icons, each key icon having an adjustable hit region of dynamically adjustable size

1004 — Receive a sequence of individual touch points input by a user on the touch screen display

1006 — After receiving each of the individual touch points:
form a user-input directed graph for the sequence of individual touch points received so far;
determine a character corresponding to a last received individual touch point in accordance with the adjustable hit regions of the displayed key icons;
display a sequence of characters corresponding to the sequence of individual touch points, including the determined character; and
update sizes of the adjustable hit regions for a plurality of the key icons

1008 — Determine one of more alternate sequences of characters corresponding to the sequence of individual touch points, and determine a respective probability for each of the alternate sequences of characters and for the displayed sequence of characters; and
Display a suggested replacement character string comprising a selected one of the alternate sequence of characters when the probability of the selected alternate sequence meets one or more predefined criteria with respect to the probability of the displayed sequence of characters

1010 — Receive a touch point corresponding to a deletion key icon;
Delete one or more of the displayed characters to produce a shortened sequence of characters;
Receive additional individual touch points; and
after receiving each of the additional individual touch points:
Determine and display a suggested character string only when the suggested character string starts with the shortened sequence of characters and the suggested character string meets predefined character string suggestion criteria.

FIG. 10A

METHOD, DEVICE, AND GRAPHICAL USER INTERFACE PROVIDING WORD RECOMMENDATIONS FOR TEXT INPUT

RELATED APPLICATIONS

This application is a continuation of U.S. patent application Ser. No. 14/800,378, filed Jul. 15, 2015, which is a continuation of U.S. patent application Ser. No. 13/559,495, filed Jul. 26, 2012, now U.S. Pat. No. 9,086,802, which is a divisional application of U.S. patent application Ser. No. 12/165,554, filed Jun. 30, 2008, now U.S. Pat. No. 8,232,973, which claims priority to U.S. Provisional Patent Application No. 61/010,619, "Method, Device, and Graphical User Interface Providing Word Recommendations for Text Input," filed Jan. 9, 2008, the entire contents of which are incorporated by reference herein in their entirety.

This application is related to: U.S. patent application Ser. No. 11/620,641, "Method and System for Providing Word Recommendations for Text Input," filed Jan. 5, 2007; U.S. patent application Ser. No. 11/620,642, "Method, System, and Graphical User Interface for Providing Word Recommendations," filed Jan. 5, 2007; U.S. patent application Ser. No. 11/850,015, "Methods for Determining a Cursor Position from a Finger Contact with a Touch Screen Display," filed Sep. 4, 2007; and U.S. patent application Ser. No. 12/101,832, "Touch Screen Device, Method, and Graphical User Interface for Determining Commands by Applying Heuristics," filed Apr. 11, 2008. All of these applications are incorporated by reference herein in their entirety

TECHNICAL FIELD

The disclosed embodiments relate generally to text input on portable communication devices, and more particularly, to methods and systems for providing word recommendations in response to text input.

BACKGROUND

In recent years, the functional capabilities of portable communications devices have increased dramatically. Current devices enable communication by voice, text, and still or moving images. Communication by text, such as by email, instant message (IM) or short messaging service (SMS), has proven to be quite popular.

However, the size of these portable communication devices also restricts the size of the text input device, such as a physical or virtual keyboard, in the portable device. With a size-restricted keyboard, designers are often forced to make the keys smaller or overload the keys. Both may lead to typing mistakes and thus more backtracking to correct the mistakes. This makes the process of communication by text on the devices inefficient and reduces user satisfaction with such portable communication devices.

Accordingly, there is a need for more efficient ways of entering text into portable devices.

SUMMARY

In accordance with some embodiments, a computer-implemented method, performed at a portable electronic device having a touch screen display, includes displaying a plurality of key icons, each key icon having an adjustable hit region of dynamically adjustable size, and receiving a sequence of individual touch points input by a user on the touch screen display. Each touch point is determined at lift off of a contact from the touch screen display. An image with an enlarged version of a character that will be selected as the character corresponding to an individual touch point is displayed prior to lift off of a respective contact, wherein the character image that is displayed prior to lift off is selected in accordance with the adjustable hit regions of the displayed key icons. After receiving each of the individual touch points, the method performs a set of operations, including: forming a user-input directed graph for the sequence of individual touch points received so far; determining a character corresponding to a last received individual touch point in accordance with the adjustable hit regions of the displayed key icons; displaying a sequence of characters corresponding to the sequence of individual touch points, including the determined character; and updating sizes of the adjustable hit regions for a plurality of the key.

In accordance with some embodiments, a computer readable storage medium, for use in conjunction with a portable electronic device having a touch screen display, stores one or more programs for execution by one or more processors of the portable electronic device. The one or more programs include instructions for displaying on the touch screen display a plurality of key icons, each key icon having an adjustable hit region of dynamically adjustable size. The one or more programs further include instructions for receiving a sequence of individual touch points input by a user on the touch screen display. Each touch point is determined at lift off of a contact from the touch screen display. An image with an enlarged version of a character that will be selected as the character corresponding to an individual touch point is displayed prior to lift off of a respective contact, wherein the character image that is displayed prior to lift off is selected in accordance with the adjustable hit regions of the displayed key icons. The one or more programs further include instructions for processing the received individual touch points by performing operations after receiving each of the individual touch points, the operations including: forming a user-input directed graph for the sequence of individual touch points received so far; determining a character corresponding to a last received individual touch point in accordance with the adjustable hit regions of the displayed key icons; displaying on the touch screen display a sequence of characters corresponding to the sequence of individual touch points, including the determined character; and updating sizes of the adjustable hit regions for a plurality of the key icons.

In accordance with some embodiments, a portable electronic device having a touch screen display includes one or more processors, memory, and one or more programs stored in the memory, the one or more programs configured to be executed by the one or more processors. The one or more programs include instructions for displaying on the touch screen display a plurality of key icons, each key icon having an adjustable hit region of dynamically adjustable size. The one or more programs further include instructions for receiving a sequence of individual touch points input by a user on the touch screen display. Each touch point is determined at lift off of a contact from the touch screen display. An image with an enlarged version of a character that will be selected as the character corresponding to an individual touch point is displayed prior to lift off of a respective contact, wherein the character image that is displayed prior to lift off is selected in accordance with the adjustable hit regions of the displayed key icons. The one or more programs further include instructions for processing the received individual touch points by performing operations after receiving each of the individual touch points, the operations including:

forming a user-input directed graph for the sequence of individual touch points received so far; determining a character corresponding to a last received individual touch point in accordance with the adjustable hit regions of the displayed key icons; displaying on the touch screen display a sequence of characters corresponding to the sequence of individual touch points, including the determined character; and updating sizes of the adjustable hit regions for a plurality of the key icons.

In accordance with some embodiments, a portable electronic device having a touch screen display includes one or more processors and memory. The portable electronic device further includes means for displaying on the touch screen display a plurality of key icons, each key icon having an adjustable hit region of dynamically adjustable size, and means for receiving a sequence of individual touch points input by a user on the touch screen display. Each touch point is determined at lift off of a contact from the touch screen display. An image with an enlarged version of a character that will be selected as the character corresponding to an individual touch point is displayed prior to lift off of a respective contact, wherein the character image that is displayed prior to lift off is selected in accordance with the adjustable hit regions of the displayed key icons. The portable electronic device further includes means for processing the received individual touch points by performing operations after receiving each of the individual touch points, the operations including: forming a user-input directed graph for the sequence of individual touch points received so far; determining a character corresponding to a last received individual touch point in accordance with the adjustable hit regions of the displayed key icons; displaying on the touch screen display a sequence of characters corresponding to the sequence of individual touch points, including the determined character; and updating sizes of the adjustable hit regions for a plurality of the key icons.

In accordance with some embodiments, a computer-implemented method, performed at a portable electronic device having a touch screen display, includes displaying a plurality of key icons, receiving a sequence of individual touch points input by a user on the touch screen display, and displaying a sequence of characters corresponding to the sequence of individual touch points. The method also includes receiving a touch point corresponding to a deletion key icon, and deleting one or more of the displayed characters to produce a shortened sequence of characters. Then the method includes receiving additional individual touch points. After receiving each of the additional individual touch points, the method performs a set of operations, including displaying a current sequence of characters including characters associated with the additional individual touch points, and determining and displaying a suggested character string only when the suggested character string starts with the shortened sequence of characters and the suggested character string meets predefined character string suggestion criteria.

In accordance with some embodiments, a computer readable storage medium, for use in conjunction with a portable electronic device having a touch screen display, stores one or more programs for execution by one or more processors of the portable electronic device. The one or more programs include instructions for displaying on the touch screen display a plurality of key icons, for receiving a sequence of individual touch points input by a user on the touch screen display, and for displaying on the touch screen display a sequence of characters corresponding to the sequence of individual touch points. The one or more programs also include instructions for receiving a touch point corresponding to a deletion key icon, and for deleting one or more of the displayed characters to produce a shortened sequence of characters. The one or more programs further include instructions for receiving additional individual touch points, and instructions for processing the received individual touch points by performing operations after receiving each of the additional individual touch points, including displaying a current sequence of characters including characters associated with the additional individual touch points, and determining and displaying a suggested character string only when the suggested character string starts with the shortened sequence of characters and the suggested character string meets predefined character string suggestion criteria.

In accordance with some embodiments, a portable electronic device having a touch screen display includes one or more processors, memory, and one or more programs stored in the memory, the one or more programs configured to be executed by the one or more processors. The one or more programs include instructions for displaying on the touch screen display a plurality of key icons, for receiving a sequence of individual touch points input by a user on the touch screen display, and for displaying on the touch screen display a sequence of characters corresponding to the sequence of individual touch points. The one or more programs also include instructions for receiving a touch point corresponding to a deletion key icon, and for deleting one or more of the displayed characters to produce a shortened sequence of characters. The one or more programs further include instructions for receiving additional individual touch points, and instructions for processing the received individual touch points by performing operations after receiving each of the additional individual touch points, including displaying a current sequence of characters including characters associated with the additional individual touch points, and determining and displaying a suggested character string only when the suggested character string starts with the shortened sequence of characters and the suggested character string meets predefined character string suggestion criteria.

In accordance with some embodiments, a portable electronic device having a touch screen display includes one or more processors and memory. The portable electronic device further includes means for displaying on the touch screen display a plurality of key icons, and means for receiving a sequence of individual touch points input by a user on the touch screen display, and means for displaying on the touch screen display a sequence of characters corresponding to the sequence of individual touch points. The portable electronic device also includes means for receiving a touch point corresponding to a deletion key icon, and means for deleting one or more of the displayed characters to produce a shortened sequence of characters. The portable electronic device further includes means for receiving additional individual touch points, and means for processing the received individual touch points by performing operations after receiving each of the additional individual touch points, including displaying a current sequence of characters including characters associated with the additional individual touch points, and determining and displaying a suggested character string only when the suggested character string starts with the shortened sequence of characters and the suggested character string meets predefined character string suggestion criteria.

In accordance with some embodiments, a computer-implemented method, performed at a portable electronic device having a touch screen display, includes: displaying a current character string being input by a user with a soft keyboard in a first area of the touch screen display; displaying a suggested replacement character string for the current character string in a second area of the touch screen display, wherein the second area includes a suggestion rejection icon adjacent to the suggested replacement character string; replacing the current character string in the first area with the suggested replacement character string in response to detecting user activation of a key on the soft keyboard associated with a delimiter; and keeping the current character string in the first area and ceasing to display the suggested replacement character string and the suggestion rejection icon in response to detecting a finger gesture on the suggested replacement character string displayed in the second area.

In accordance with some embodiments, a computer readable storage medium has stored therein instructions, which when executed by a portable electronic device with a touch screen display, cause the portable electronic device to: display a current character string being input by a user with a soft keyboard in a first area of the touch screen display; display a suggested replacement character string for the current character string in a second area of the touch screen display, wherein the second area includes a suggestion rejection icon adjacent to the suggested replacement character string; replace the current character string in the first area with the suggested replacement character string in response to detecting user activation of a key on the soft keyboard associated with a delimiter; and keep the current character string in the first area and cease to display the suggested replacement character string and the suggestion rejection icon in response to detecting a finger gesture on the suggested replacement character string displayed in the second area.

In accordance with some embodiments, a portable electronic device includes: a touch screen display; one or more processors; memory; and one or more programs. The one or more programs are stored in the memory and configured to be executed by the one or more processors. The one or more programs include instructions for: displaying a current character string being input by a user with a soft keyboard in a first area of the touch screen display; displaying a suggested replacement character string for the current character string in a second area of the touch screen display, wherein the second area includes a suggestion rejection icon adjacent to the suggested replacement character string; replacing the current character string in the first area with the suggested replacement character string in response to detecting user activation of a key on the soft keyboard associated with a delimiter; and keeping the current character string in the first area and ceasing to display the suggested replacement character string and the suggestion rejection icon in response to detecting a finger gesture on the suggested replacement character string displayed in the second area.

In accordance with some embodiments, a graphical user interface on a portable electronic device with a touch screen display includes a first area of the touch screen display; a current character string being input by a user with a soft keyboard in the first area of the touch screen display; and a second area of the touch screen display that includes a suggested replacement character string and a suggestion rejection icon adjacent to the suggested replacement character string. In response to detecting user activation of a key on the soft keyboard associated with a delimiter, the current character string in the first area is replaced with the suggested replacement character string. In response to detecting a finger gesture on the suggested replacement character string displayed in the second area, the current character string is kept in the first area and display of the suggested replacement character string and the suggestion rejection icon are ceased.

Thus, the embodiments provide more efficient ways to enter text in a portable device.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

FIGS. 7A-7C illustrate examples of scoring of candidate words in accordance with some embodiments.

FIG. 9 illustrates an exemplary derivation of candidate words based on text input in accordance with some embodiments.

FIGS. 10A and 10B are flow diagrams illustrating text input processes in accordance with some embodiments.

DESCRIPTION OF EMBODIMENTS

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

A portable communication device includes a user interface and a text input device. Via the interface and the text input device, a user may enter text into the device. The text includes words, which are sequences of characters separated by whitespaces or particular punctuation. For a word as it is being entered or an entered word, the device identifies and offers word recommendations that may be selected by the user to replace the word as inputted by the user.

Figure 1:
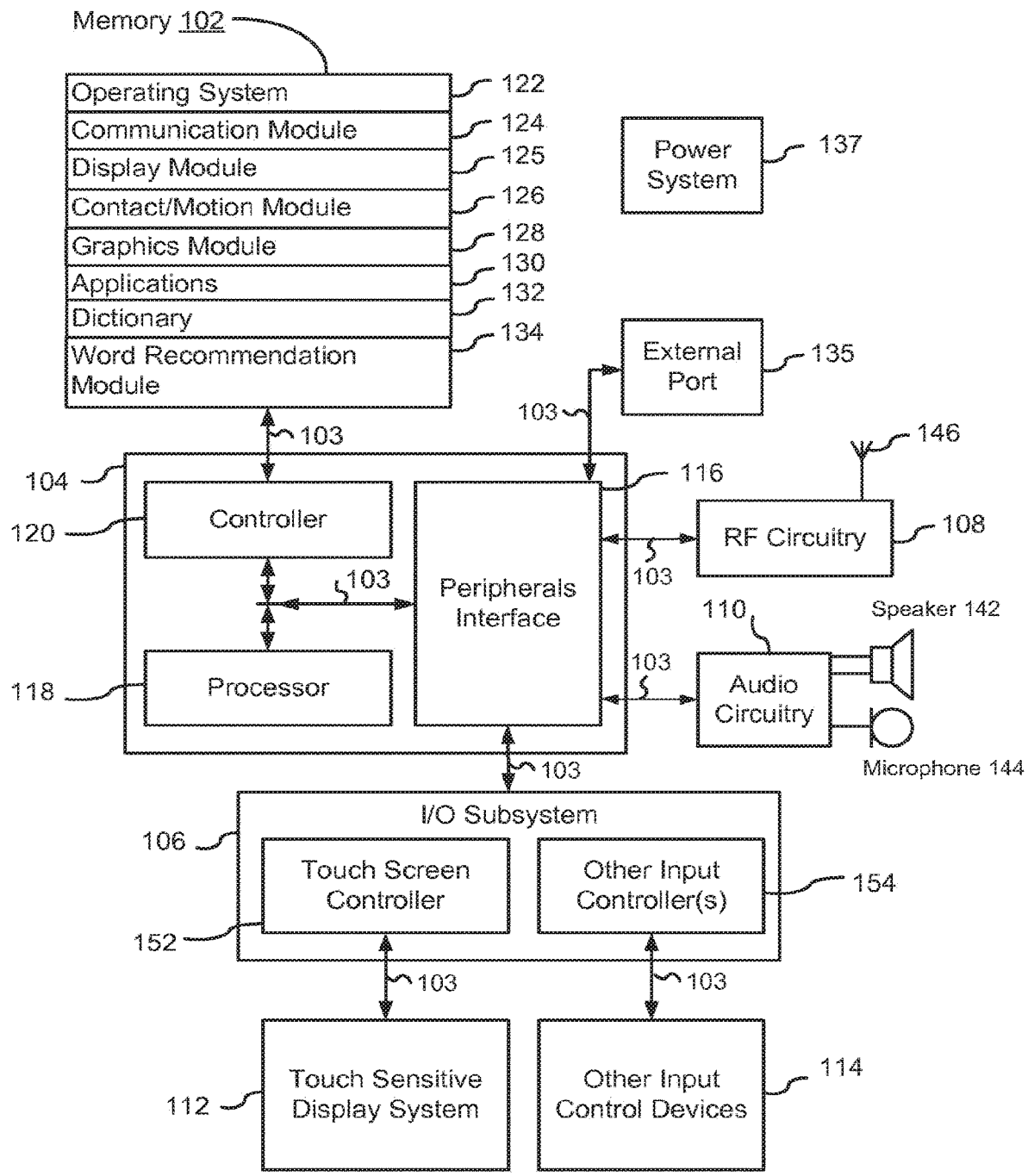
FIG. 1 is a block diagram illustrating a portable communications device in accordance with some embodiments.

Attention is now directed to an embodiment of a portable communications device. FIG. 1 is a block diagram illustrating an embodiment of a device 100, such as a portable electronic device having a touch-sensitive display 112. The device 100 may include a memory controller 120, one or more data processors, image processors and/or central processing units 118 and a peripherals interface 116. The memory controller 120, the one or more processors 118 and/or the peripherals interface 116 may be separate components or maybe integrated, such as in one or more integrated circuits 104. The various components in the device 100 may be coupled by one or more communication buses or signal lines 103.

The peripherals interface 116 may be coupled to an optical sensor (not shown), such as a CMOS or CCD image sensor; RF circuitry 108; audio circuitry 110; and/or an input/output (I/O) subsystem 106. The audio circuitry 110 may be coupled to a speaker 142 and a micro-phone 144. The device 100 may support voice recognition and/or voice replication. The RF circuitry 108 may be coupled to one or more antennas 146 and may allow communication with one or more additional devices, computers and/or servers using a wireless network. The device 100 may support a variety of communications protocols, including code division multiple access (CDMA), Global System for Mobile Communications (GSM), Enhanced Data GSM Environment (EDGE), Wi-Fi (such as IEEE 802.11a, IEEE 802.11b, IEEE 802.11g and/or IEEE 802.11n), Bluetooth, Wi-MAX, a protocol for email, instant messaging, and/or a short message service (SMS), or any other suitable communication protocol, including communication protocols not yet developed as of the filing date of this document. In an exemplary embodiment, the device 100 may be, at least in part, a cellular telephone.

The I/O subsystem 106 may include a touch screen controller 152 and/or other input controller(s) 154. The touch-screen controller 152 may be coupled to a touch-sensitive screen or touch sensitive display system 112.

The touch-sensitive display system 112 provides an input interface and an output interface between the device and a user. The display controller 152 receives and/or sends electrical signals from/to the display system 112. The display system 112 displays visual output to the user. The visual output may include graphics, text, icons, video, and any combination thereof (collectively termed "graphics"). In some embodiments, some or all of the visual output may correspond to user-interface objects, further details of which are described below.

A touch screen in display system 112 is a touch-sensitive surface that accepts input from the user based on haptic and/or tactile contact. The display system 112 and the display controller 152 (along with any associated modules and/or sets of instructions in memory 102) detect contact (and any movement or breaking of the contact) on the display system 112 and converts the detected contact into interaction with user-interface objects (e.g., one or more soft keys, icons, web pages or images) that are displayed on the touch screen. The touch screen 112 may be used to implement virtual or soft buttons and/or a keyboard. In an exemplary embodiment, a point of contact between a touch screen in the display system 112 and the user corresponds to a finger of the user.

The touch screen in the display system 112 may use LCD (liquid crystal display) technology, or LPD (light emitting polymer display) technology, although other display technologies may be used in other embodiments. The touch screen in the display system 112 and the display controller 152 may detect contact and any movement or breaking (lift off) thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen in the display system 112. A touch-sensitive display in some embodiments of the display system 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, a touch screen in the display system 112 displays visual output from the portable device 100, whereas touch sensitive tablets do not provide visual output. The touch screen in the display system 112 may have a resolution in excess of 100 dpi. In an exemplary embodiment, the touch screen in the display system has a resolution of approximately 168 dpi. The user may make contact with the touch screen in the display system 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position (e.g., a touch point position) or command for performing the actions desired by the user.

A touch-sensitive display in some embodiments of the display system 112 may be as described in the following applications: (1) U.S. patent application Ser. No. 11/381,313, "Multipoint Touch Surface Controller," filed on May 2, 2006; (2) U.S. patent application Ser. No. 10/840,862, "Multipoint Touchscreen," filed on May 6, 2004; (3) U.S. patent application Ser. No. 10/903,964, "Gestures For Touch Sensitive Input Devices," filed on Jul. 30, 2004; (4) U.S. patent application Ser. No. 11/048,264, "Gestures For Touch Sensitive Input Devices," filed on Jan. 31, 2005; (5) U.S. patent application Ser. No. 11/038,590, "Mode-Based Graphical User Interfaces For Touch Sensitive Input Devices," filed on Jan. 18, 2005; (6) U.S. patent application Ser. No. 11/228,758, "Virtual Input Device Placement On A Touch Screen User Interface," filed on Sep. 16, 2005; (7) U.S. patent application Ser. No. 11/228,700, "Operation Of A Computer With A Touch Screen Interface," filed on Sep. 16, 2005; (8) U.S. patent application Ser. No. 11/228,737, "Activating Virtual Keys Of A Touch-Screen Virtual Keyboard," filed on Sep. 16, 2005; and (9) U.S. patent application Ser. No. 11/367,749, "Multi-Functional Hand-Held Device," filed on Mar. 3, 2006. All of these applications are incorporated by reference herein in their entirety.

The other input controller(s) 154 may be coupled to other input/control devices 114, such as one or more buttons, a keyboard, infrared port, USB port, and/or a pointer device such as a mouse. The one or more buttons (not shown) may include an up/down button for volume control of the speaker 142 and/or the micro-phone 144. The one or more buttons (not shown) may include a push button. A quick press of the push button (not shown) may engage or disengage a lock of the touch screen 112. A longer press of the push button (not shown) may turn power to the device 100 on or off. The user may be able to customize a functionality of one or more of the buttons.

In some embodiments, the device 100 may include circuitry for supporting a location determining capability, such as that provided by the global positioning system (GPS). In some embodiments, the device 100 may be used to play back recorded music stored in one or more files, such as MP3 files or AAC files. In some embodiments, the device 100 may include the functionality of an MP3 player, such as an iPod (trademark of Apple Computer, Inc.). In some embodiments, the external port is a multi-pin (e.g., 30-pin) connector that is the same as, or similar to and/or compatible with the 30-pin connector used on iPod devices.

The device 100 also includes a power system 137 for powering the various components. The power system 137 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices. The device 100 may also include one or more external ports 135 for connecting the device 100 to other devices.

The memory controller 120 may be coupled to memory 102 with one or more types of computer readable storage media. Memory 102 may include high-speed random access memory and/or non-volatile memory, such as one or more magnetic disk storage devices, one or more optical storage devices, and/or flash memory. Memory 102 may store an operating system 122, such as Darwin, RTXC, LINUX, UNIX, OS X, WINDOWS, or an embedded operating system such as VxWorks. The operating system 122 may include procedures (or sets of instructions) for handling basic system services and for performing hardware dependent tasks. Memory 102 may also store communication procedures (or sets of instructions) in a communication module 124. The communication procedures may be used for communicating with one or more additional devices, one or more computers and/or one or more servers. Memory 102 may include a display module (or a set of instructions) 125, a contact/motion module (or a set of instructions) 126 to determine one or more points of contact and/or their movement, and a graphics module (or a set of instructions) 128. The graphics module 128 may support widgets, that is, modules or applications with embedded graphics. The widgets may be implemented using JavaScript, HTML, or other suitable languages.

Memory 102 may also include one or more applications 130. Examples of applications include email applications, text messaging or instant messaging applications, web browsers, memo pad applications, address books or contact lists, and calendars.

Also in memory 102 are one or more dictionaries 132 and a word recommendation module (or set of instructions) 134. In some embodiments, a dictionary contains a list of words and corresponding usage frequency rankings. The usage frequency ranking of a word is the statistical usage frequency for that word in a language, or by a predefined group or people, or by the user of the device 100, or a combination thereof. As described below, a dictionary may include multiple usage frequency rankings for regional variations of the same language and/or be tailored to a user's own usage frequency, e.g., derived from the user's prior emails, text messages, address book, and other previous input from the user. The word recommendation module identifies word recommendations for presentation to the user in response to text input by the user.

Each of the above identified modules and applications corresponds to a set of instructions for performing one or more functions described above. These modules (i.e., sets of instructions) need not be implemented as separate software programs, procedures or modules. The various modules and sub-modules may be rearranged and/or combined. Memory 102 may include additional modules and/or sub-modules, or fewer modules and/or sub-modules. Memory 102, therefore, may include a subset or a superset of the above identified modules and/or sub-modules. Various functions of the device 100 may be implemented in hardware and/or in software, including in one or more signal processing and/or application specific integrated circuits.

Figure 2:
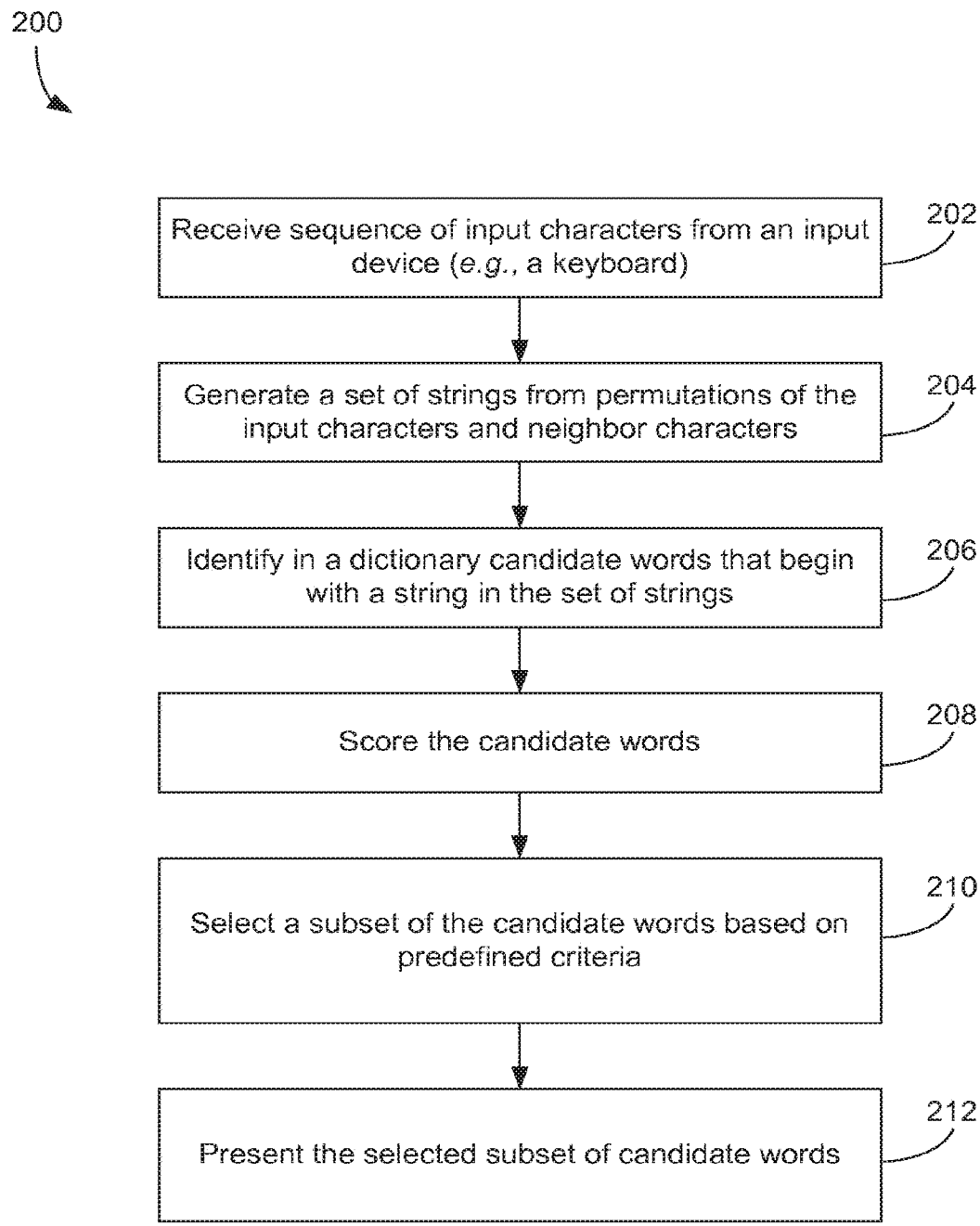
FIG. 2 is a flow diagram illustrating a process of providing word recommendations in accordance with some embodiments.

Attention is now directed to FIG. 2, a flow diagram illustrating a process of providing word recommendations in accordance with some embodiments. Process flow 200 describes a process of providing word recommendations in response to input of a character string by a user.

A sequence of input characters is received from an input device (202). A user inputs a sequence of characters into the portable communications device via an input device, such as a keyboard, and the device receives the input. As used herein, the input character sequence is a sequence of non-whitespace characters, delimited by whitespaces or punctuation, input by the user via the input device. The sequence of characters may constitute a word.

In some embodiments, the input device is a virtual keyboard (also called a soft keyboard) displayed on a touch-sensitive display of the portable device, where the user hits the keys of the keyboard ("types on the keyboard") by touching the touch-sensitive display on locations corresponding to keys of the virtual keyboard. In some other embodiments, the input device is a physical keyboard on the device (also called a hard keyboard).

The keyboard, whether virtual or physical, has a plurality of keys, each key corresponding to one or more characters, such as letters, numbers, punctuation, or symbols. The keys are arranged in accordance with a predefined layout that defines the positions of the keys on the keyboard. On the layout, each key has at least one neighbor key. In some embodiments, the keyboard layout follows the well-known QWERTY layout or a variant thereof. In some other embodiments, the keyboard layout may follow other layouts. Furthermore, in some embodiments, the layout may change depending on the language used on the device. For example, if English is selected as the user interface language, then the active keyboard layout may be the QWERTY layout, and other layouts may be active when another language, such as Swedish or French, is selected as the user interface language. Further details regarding keyboard layouts are described below in relation to FIG. 5.

Permutations of input characters and neighbor characters are determined and a set of strings are generated from the permutations (204). As used herein, a "permutation" is a sequence of characters, wherein each character in the sequence is either the input character in the corresponding position in the input character sequence or a neighbor character of that input character on the keyboard layout. The first character in the permutation is the first character of the input character sequence or a neighbor of that first character on the keyboard layout, the second character in the permutation is the second character of the input character sequence or a neighbor of that second character on the keyboard layout, and so forth, up to and perhaps including the last character in the input character sequence. Thus, the length of a permutation and of a generated string is at most the length of the input character sequence.

For example, if the input sequence is "rheater," then the first character in any of the permutations generated for this input sequence is "r" (the first character in the input sequence) or any characters that are neighbors to "r" on the keyboard layout. The second character in a permutation is "h" or any neighbor thereof. The third character in a permutation is "e" (the third character in the input sequence) or neighbors thereof, and so forth.

In some embodiments, permutations may be determined for a predefined-length subset of the input sequence and strings of the same predefined length may be generated from the permutations. In some embodiments, the predefined length is 3 characters. That is, the permutations are determined and prefix strings are generated from the first three characters in the input sequence and neighbors thereof. If the length of the input sequence is less than the predefined length, a process other than process flow 200 may be used to provide word recommendations. For example, if the input sequence is one or two characters long, the input sequence in its entirety may be compared against words in a dictionary and best matches are identified.

The set of strings are compared against a dictionary. Words in the dictionary that have any of the set of strings as a prefix are identified (206). As used herein, "prefix" means that the string is a prefix of a word in the dictionary or is itself a word in the dictionary. A dictionary, as used herein, refers to a list of words. The dictionary may be pre-made and stored in the memory. The dictionary may also include usage frequency rankings for each word in the dictionary. A usage frequency ranking for a word indicates (or more generally, corresponds to) the statistical usage frequency for that word in a language. In some embodiments, the dictionary may include different usage frequency rankings for different variants of a language. For example, a dictionary of words in the English language may have different usage frequency rankings with respect to American English and British English.

In some embodiments, the dictionary may be customizable. That is, additional words may be added to the dictionary by the user. Furthermore, in some embodiments, different applications may have different dictionaries with different words and usage frequency rankings. For example, an email application and an SMS application may have different dictionaries, with different words and perhaps different usage frequency rankings within the same language.

The identified words are the candidate words that may be presented to the user as recommended replacements for the input sequence. The candidate words are scored (208). Each candidate word is scored based on a character-to-character comparison with the input sequence and optionally other factors. Further details regarding the scoring of candidate words are described below, in relation to FIGS. 3 and 7A-7C. A subset of the candidate words are selected based on predefined criteria (210) and the selected subset is presented to the user (212). In some embodiments, the selected candidate words are presented to the user as a horizontal listing of words.

Figure 3:
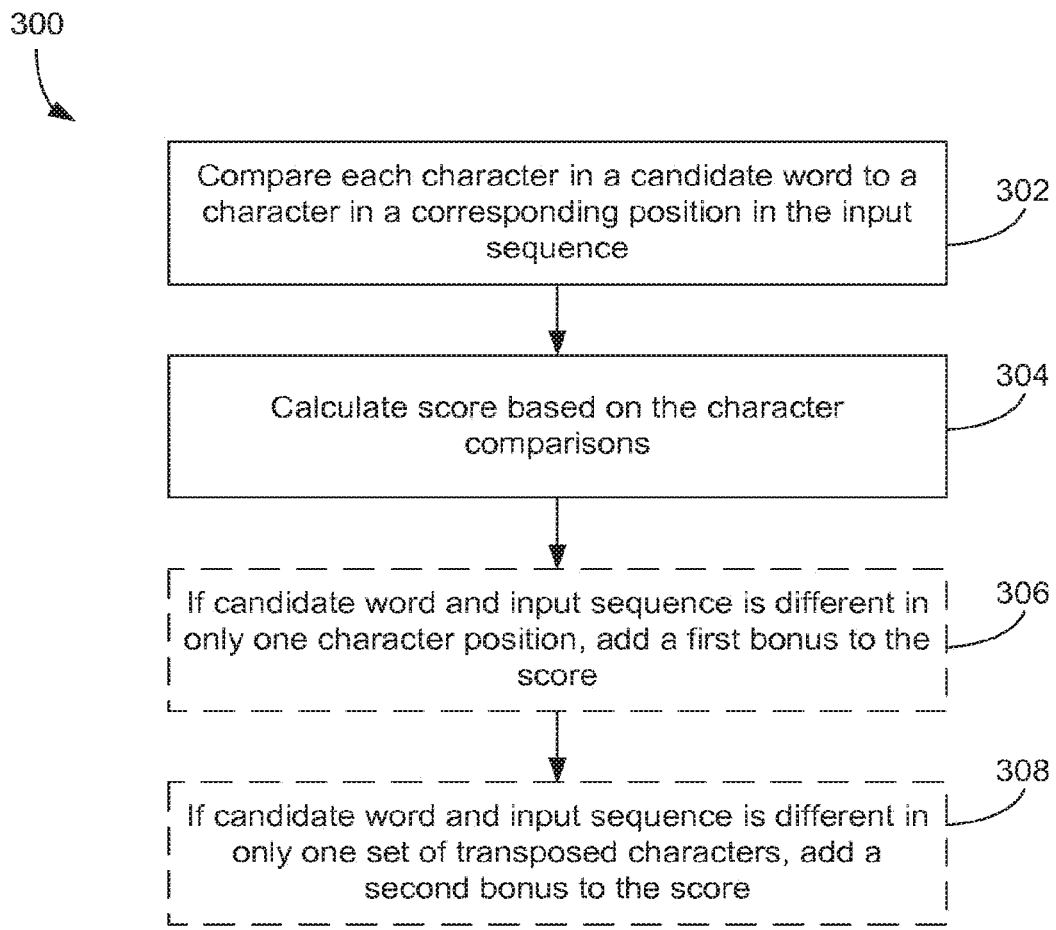
FIG. 3 is a flow diagram illustrating a process of scoring candidate words in accordance with some embodiments.

Attention is now directed to FIG. 3, a flow diagram illustrating a process of scoring candidate words in accordance with some embodiments. Process flow 300 describes a process of scoring a candidate word. The scoring helps determine which word(s) in the dictionary is/are the best potential replacement(s) for the input sequence of characters.

Each character in a candidate word is compared to the character in the corresponding position in the input sequence (302). Thus, the first character in the candidate word is compared to the first character in the input sequence, the second character in the candidate word is compared to the second character in the input sequence, and so forth. If either the candidate word or the input sequence is longer than the other, then the additional characters beyond the shorter length of the two are ignored in the comparison. In some embodiments, further comparison of the candidate word with the input sequence may be made. For example, the further comparison may include determining the number of character differences between the candidate words and the input sequence, and determining if any character differences are a result of transposed characters. A score is calculated for the candidate word based on the comparison described above (304). Each character comparison yields a value, and the values are added to yield the score for the candidate word.

In some embodiments, the score value given for a character comparison is based on the actual characters as opposed to merely whether the characters match. More particularly, the value may be based on whether the character in the candidate word matches the corresponding character in the input sequence exactly and/or whether the character in the candidate word is a keyboard layout neighbor of the corresponding character in the input sequence.

Optionally, a first "bonus" may be added to the score of the candidate word if the candidate word and the input sequence are different in only one character (306). Similarly, an optional second "bonus" may be added to the score of the candidate word if the candidate word and the input sequence are different in only a pair of transposed adjacent characters (308). Further details regarding candidate word scoring is described below, in relation to FIGS. 7A-7C.

Figure 4:
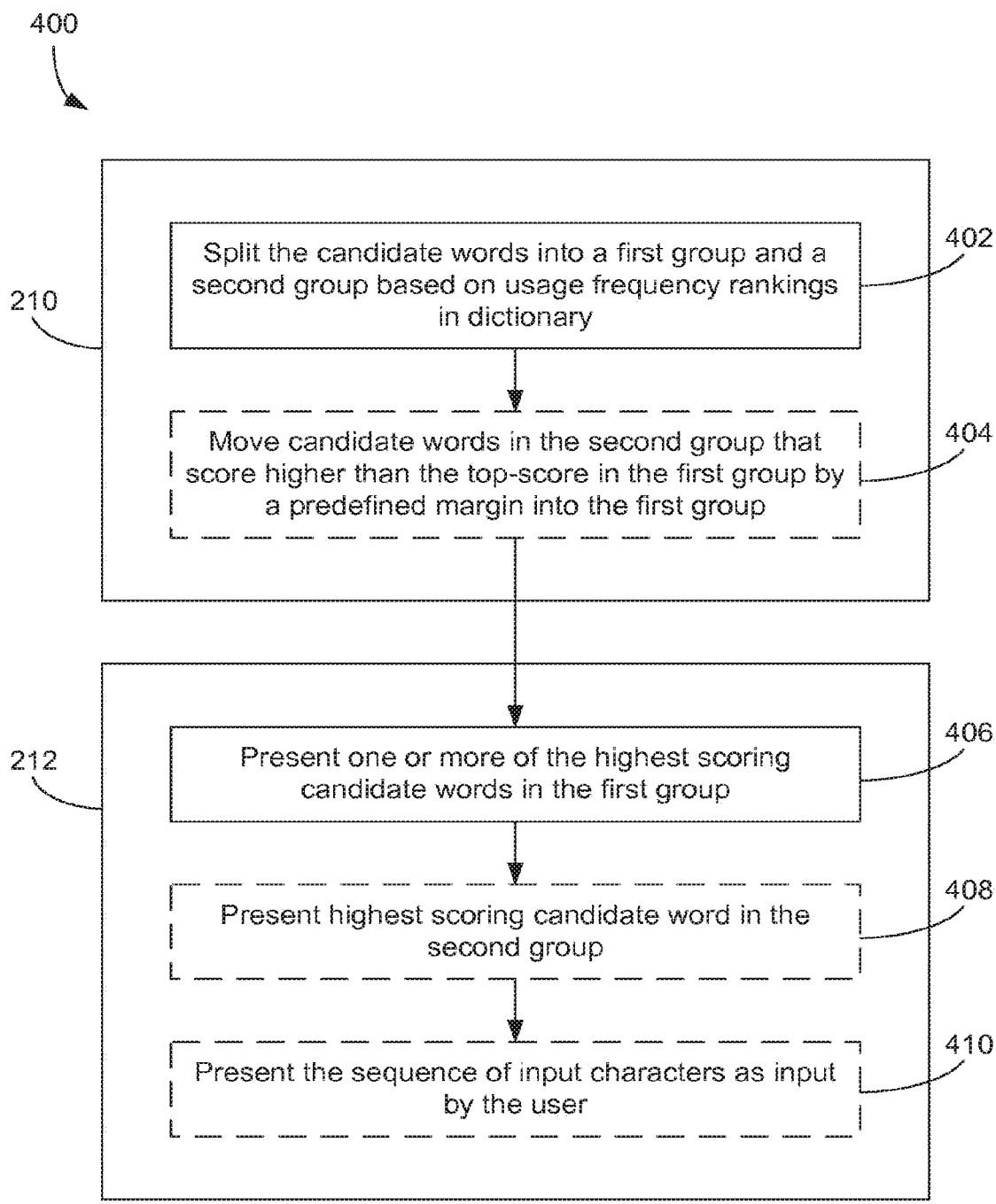
FIG. 4 is a flow diagram illustrating a process of selecting and presenting candidate words in accordance with some embodiments.

Attention is now directed to FIG. 4, a flow diagram illustrating a process of selecting and presenting candidate words in accordance with some embodiments. Process flow 400 describes in further details blocks 210 and 212 (FIG. 2), which involves selection and presentation of candidate words.

In some embodiments, the candidate words are split into two groups based on their usage frequency rankings within the dictionary (402). A first group includes the candidate words whose usage frequency rankings exceed a predefined threshold. The second group includes the candidate words whose usage frequency rankings does not exceed the threshold. With each of the two groups, the candidate words are sorted by their candidate word scores.

There may be candidate words in the second group whose scores are very high because, for example, they match the input sequence exactly or almost exactly. In some embodiments, these high-scoring words may be removed from the second group and added to the first group if their scores exceed the score of the highest scoring candidate word in the first group by a predefined margin (404). In some embodiments, the predefined margin is that the score of the candidate word in the second group must be at least two times the highest candidate word score in the first group.

One or more of the highest scoring candidate words in the first group are presented to the user (406). It should be appreciated that if candidate words from the second group were moved to the first group as described above, then the candidate words that are presented will include at least one candidate word that was originally in the second group since that candidate word has a higher score than any of the original candidate words in the first group.

In some embodiments, if block 404 is not performed, either because no candidate word in the second group satisfies the score margin threshold or because the moving of candidate words is not performed at all, the highest scoring candidate word in the second group may nevertheless be presented along with the candidate words from the first group (408). Furthermore, in some embodiments, the input sequence as entered by the user may be presented as a matter of course (410). The user may choose any one of the presented candidate words to replace the input sequence, including choosing the input sequence as entered if the user is satisfied with it.

Figure 5A:
FIGS. 5A and 5B illustrate exemplary layouts of letter keys on a keyboard in accordance with some embodiments.
Figure 5B:

Attention is now directed to FIGS. 5A and 5B, which are exemplary layouts of letter keys on a keyboard in accordance with some embodiments. As described above, the prefix strings, based on which candidate words are identified, are generated based on characters in the input sequence and their corresponding neighbor characters on a keyboard layout. Keyboard layouts 502 and 504 are exemplary keyboard layouts. A keyboard layout defines the positions of each key on the keyboard and the alignment of the keys relative to each other. For ease of description, only the letter keys of the layouts 502 and 504 are shown. It should be appreciated, however, that a keyboard layout may also include keys for numbers, punctuation, symbols, and functional keys. In some embodiments, some keys may be overloaded, that is, a key may correspond to multiple characters and/or functions.

Layouts 502 and 504 are layouts that follow the well-known QWERTY layout. However, the key alignment in layout 502 is different from the key alignment in layout 504. In layout 502, the keys are aligned in rows but not in columns; a key in one row may straddle two keys in an adjacent row. For example, key "T" straddles keys "F" and "G" in layout 502. In layout 504, the keys are aligned in columns as well as in rows. The definition of which keys are the neighbors of a key may be different depending on how the keys are aligned. In layout 502, the neighbors of a particular key may be defined as the keys that are directly adjacent to the particular key or whose peripheries "touch" a periphery of the particular key. For example, the neighbors of key "G" in layout 502 are keys "T," "Y," "F," "H," "V," and "B;" and the neighbors of key "W" are keys "Q," "E," "A," and "S." In layout 504, the neighbors of a particular key may be defined as the keys that are immediately above, below, to the side of, and diagonal of the particular key. For example, the neighbors of key "G" in layout 504 are keys "R," "T," "Y," "F," "H," "C," "V," and "B;" and the neighbors of key "W" are keys "Q," "E," "A," "S," and "D."

It should be appreciated, however, that layouts 502 and 504 are merely exemplary, and that other layouts and key alignments are possible and the same key may have different neighbors in different layouts.

Figure 6:
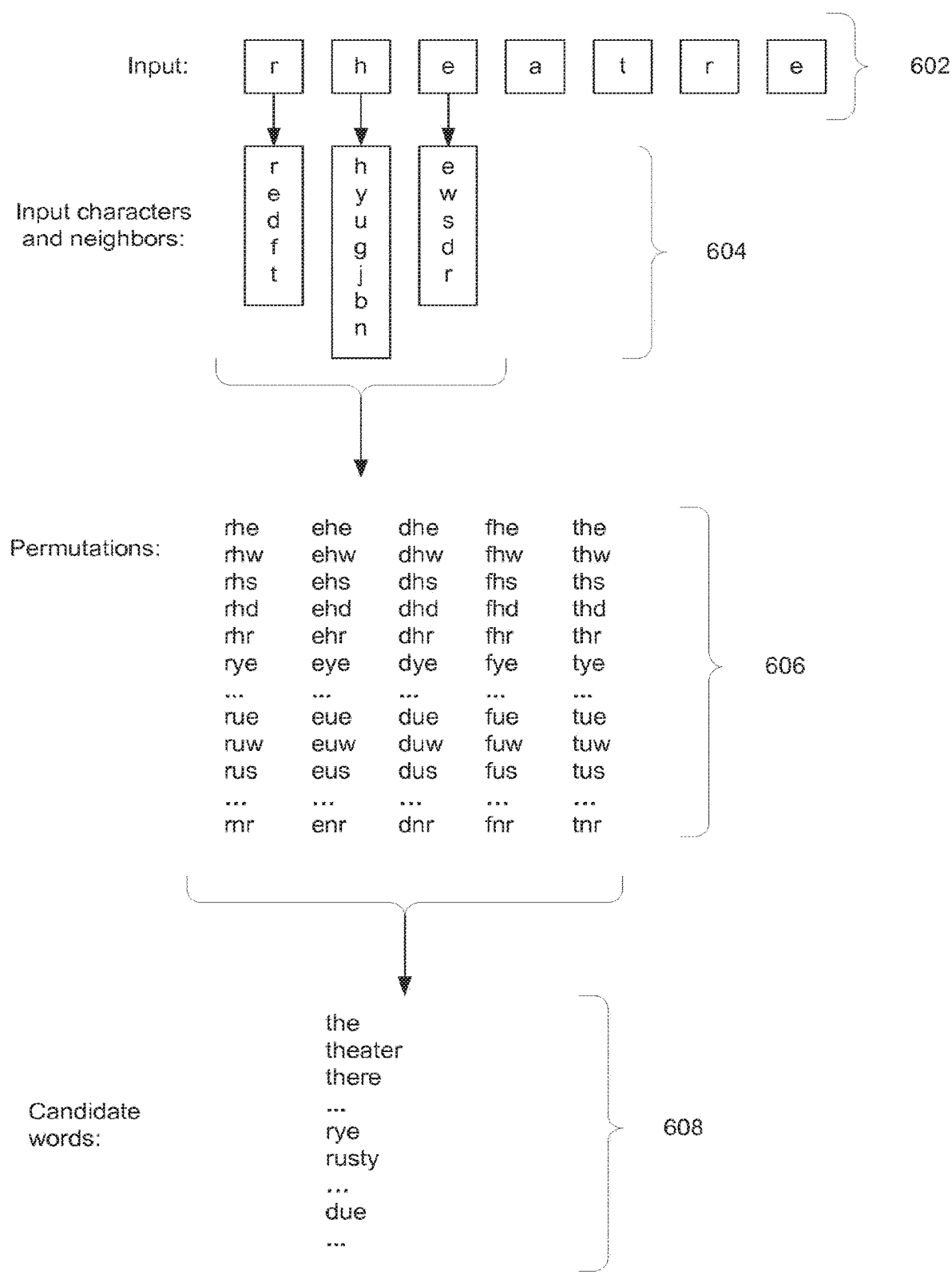
FIG. 6 illustrates an exemplary derivation of candidate words based on text input in accordance with some embodiments.

Attention is now directed to FIG. 6, an exemplary derivation of candidate words based on a text input in accordance with some embodiments. FIG. 6 illustrates an example of the identification of candidate words from an input sequence.

In FIG. 6, the input sequence 602 is "rheatre." For prefix strings of three characters in length, the first three characters and their corresponding neighbors 604 are identified. Here, the first character is "r" and its neighbors, in accordance with the layout 502, are "e," "d," "f," and "t." The second character is "h," and its neighbors are "y," "u," "g," "j," "b," and "n." The third character is "e," and its neighbors are "w," "s," "d," and "r."

From the input characters and corresponding neighbors, the character permutations 606 are determined. Each permutation is a character combination where the first character is the first input character or a neighbor thereof, the second character is the second input character or a neighbor thereof, and the third character is the third input character or a neighbor thereof. From these permutations, prefix strings are generated and compared to words in the dictionary. Examples of three-character permutations based on the input sequence 602 include "the," "rus," "rye," and "due." Words in the dictionary that have one of these strings as a prefix are identified as candidate words 608. Examples of candidate words include "theater," "rye," "rusty," "due," "the," and "there." In other embodiments, the character permutations may include four, five, or more characters, rather than three characters.

Attention is now directed to FIGS. 7A-7C, which are examples of scoring of candidate words in accordance with some embodiments. FIG. 7A shows an input sequence and three possible candidate words that may be identified from permutations of the first three characters of the input sequence. The candidate words are compared to the input sequence character-by-character and scores for the candidate words are tallied.

In some embodiments, a score tally of a candidate word involves assigning a value for each character comparison and adding the values together. The value that is assigned for a character comparison is based on the result of the comparison. Particularly, the value is based on whether the character in the candidate word, compared to the character in the corresponding position in the input sequence, is an exact match, a neighbor on the keyboard layout, or neither. In some embodiments, the value assigned for an exact match is a predefined value N. If the characters are not an exact match but are neighbors, then the value assigned is a value $\alpha N$, where $\alpha$ is a constant and $\alpha<1$. In some embodiments, $\alpha$ is 0.5. In other words, the value assigned for a neighbor match is a reduction of the value for an exact match.

In some embodiments, if the character in the candidate word is neither an exact match or a neighbor of the corresponding character in the input sequence, then the assigned value is $\beta N$, where $\beta$ is a constant and $\beta<\alpha<1$. For example, $\beta$ may be 0.25. In some other embodiments, $\beta$ may be a function of the "distance" between the characters on the keyboard layout. That is, $\beta$ may be a smaller number if the candidate word character is farther away on the keyboard layout from the input sequence character than if the candidate word character is closer on the keyboard layout from the input sequence character without being a neighbor.

More generally, the value assigned for a character comparison is $\gamma N$, where N is a predefined value, $\gamma=1$ for an exact match, and $\gamma$ may vary based on some function of the "distance" on the layout between the character in the candidate word and the corresponding character in the input sequence. For example, $\gamma$ may be 1 for an exact match, 0.5 for a neighbor, and 0 otherwise. As another example, $\gamma$ may be 0.5 for a neighbor (a 1-key radius), 0.25 for keys that are two keys away (a 2-key radius), and 0 for keys that are three or more keys away. In some embodiments, N is equal to 1.

If the candidate word has a length that is longer than the input sequence, or vice versa, then the character positions that are beyond the lesser of the two lengths are ignored or assigned a value of 0.

The first candidate word shown in FIG. 7A is "theater." Compared to the input sequence of "rheatre," there are exact matches in the second thru fifth positions. The characters in the first, sixth, and seventh positions of the candidate word are keyboard layout neighbors of input sequence characters in the corresponding positions. Thus, the score for "theater" in this case is $0.5N+N+N+N+N+0.5N+0.5N=5.5N$.

The second candidate word is "threats." Compared to the input sequence of "rheatre," there is an exact match in the second position. The characters in the first, third, sixth, and seventh positions of the candidate word are keyboard layout neighbors of the input sequence characters in the corresponding positions, and the characters in the fourth and fifth positions of the candidate word are neither exact matches nor neighbors of the input sequence characters in the corresponding positions. Thus, the score for "threats" in this case is 0.5N+N+0.5N+0.25N+0.25N+0.5N+0.5N=3.5N.

The third candidate word is "there." Compared to the input sequence of "rheatre," there is an exact match in the second and third positions. The character in the first position of the candidate word is a keyboard layout neighbor of the input sequence character in the corresponding position, and the characters in the fourth and fifth positions of the candidate word are neither exact matches nor neighbors of the input sequence characters in the corresponding positions. Furthermore, because the input sequence is two characters longer than the candidate word, the last two characters in the input sequence are ignored in the comparison and are assigned score values of 0. Thus, the score for "there" in this case is 0.5N+N+N+0.25N+0.25N=3N.

Some candidate words, when compared to the input sequence, may merit a score bonus, examples of which are shown in FIGS. 7B and 7C. In FIG. 7B, the input sequence is "thaeter" and the candidate word is "theater." The score based on the character comparisons alone is 5.5N. However, the only difference between "thaeter" and "theater" is a pair of transposed or swapped characters, namely "ae" in "thaeter" vs. "ea" in "theater." In some embodiments, a first bonus P is added to the score for this fact. In FIG. 7C, the input sequence is "thester" and the candidate word is "theater." The score based on the character comparisons alone is 6.5N. However, the only difference between "thester" and "theater" is a single character, namely "s" in "thester" vs. "a" in "theater." In some embodiments, a second bonus Q is added to the score for this fact. In some embodiments, both P and Q are equal to 0.75.

It should be appreciated that, in some other embodiments, alternative candidate word scoring and selection schemes other than the ones described above may be used.

For example, one alternative scheme may include, instead of dividing the candidate words into the first and second groups based on usage frequency rankings, the usage frequency rankings may instead be used as a weighting to be applied to candidate word scores. That is, the score of a candidate word is multiplied by the usage frequency ranking of the candidate word, and candidate words for presentation are selected based on their weighted scores.

As another example, another scheme replaces candidate word scoring based on character-by-character comparisons, as described above, with scoring based on the edit distance (also known as the Levenshtein distance) between the input sequence and the candidate word. That is, the score of a candidate word is the edit distance between the candidate word and the input sequence, or a function thereof, and candidate words are selected for presentation based on the edit distance scores. Alternately, the score for each candidate is based on the edit distance multiplied by (or otherwise combined with) the usage frequency ranking of the candidate, and candidate words are selected for presentation based on these scores.

As another example, another scheme uses a graph-matching technique. In this technique, the sequence of individual touch points that a user inputs into the device for a word (e.g., by contacts with a virtual keyboard on the touch screen) form a directed graph. This user-input directed graph is compared against a collection of directed graphs for respective words in a dictionary to generate a list of dictionary words that most closely match the user typing. In some embodiments, the probability that a user-input directed graph matches the directed graph for a dictionary word is calculated as follows:

Let $U_{1\ldots n}$ be each point in the user-input directed graph.

Let $D_{1\ldots n}$ be each point in the directed graph of a dictionary word. Points in this directed graph are assigned based on the centroid of the key that inputs the corresponding letter, as represented in the keyboard user interface.

Let $P_{1\ldots n}$ be, for each point in the user-input directed graph, the probability that the letter corresponding to $U_x$ equals the letter corresponding to $D_x$. In some embodiments, a respective $P_x$ is computed by calculating the Euclidean distance between the points $U_x$ and $D_x$, and applying a factor based on the size of the user interface elements that indicate the keys on the keyboard. A minimum probability may be entered for $P_x$ if the graphs for the user word and the dictionary word are different lengths. In one embodiment, the factor (based on the size of the user interface elements that indicate the keys on the keyboard) is a divisor that is equal to, or proportional to, the distance between center points of two horizontally adjacent keys on the keyboard.

Multiplying the probabilities in $P_{1\ldots n}$ together yields G, the probability that a graph for a dictionary word matches the user-input graph. In some embodiments, G is multiplied by F, the frequency that the word occurs in the source language/domain. Furthermore, in some embodiments G is also multiplied by N, a factor calculated by considering one or more words previously typed by the user. For example, in a sentence/passage being typed by a user, "to" is more likely to follow "going," but "ti" is more likely to follow "do re mi fa so la." In some embodiments, G is multiplied by both F and N to yield Ω, the probability that a user-input directed graph matches a dictionary word.

The collection of dictionary words with the highest probabilities may be presented in a display for user consideration, for example as described in "Method, System, and Graphical User Interface for Providing Word Recommendations" (U.S. patent application Ser. No. 11/620,642, filed Jan. 5, 2007), the content of which is hereby incorporated by reference in its entirety. In some embodiments, the top-ranked word is presented for selection by the user as described below with respect to FIGS. 11A, 11B, and 12. In some embodiments, the top-ranked word is selected for the user by the device without user intervention.

In some embodiments, as word recommendations are offered by the portable device and selected by the user, statistics regarding the corrections made are collected. For example, the characters in an input sequence that was replaced by a candidate word selected by the user and the corresponding characters may be logged. Over time, the corrections log may be analyzed for patterns that may indicate a pattern of repeated typing errors by the user. If the keyboard is a virtual keyboard on a touch screen of the portable device, the portable device may automatically adjust or recalibrate the contact regions of the keys of the virtual keyboard to compensate for the user pattern of typing errors. As another example, for a given input sequence, the word selected by the user may be recommended first or given a higher score when the same input sequence is subsequently entered by the user.

In some embodiments, a user interface object is activated if the determined touch point position falls within a user interface object's "hit region" (or equivalently, "hit area")

and there are no overlapping objects with larger hit regions. The hit region of a user interface object may be the same size as, or larger, or smaller, than the visible size of the user interface object as it is displayed on the touch screen. As explained below, an object (e.g., a high-probability next character in a keyboard during text input) may have a hit region that is larger than the visible size of the user interface object as it is displayed on the touch screen (e.g., key icon "O" has an enlarged hit region denoted by the dotted line around the "O" key icon in FIG. 8B). For such objects, the portion of the hit region that is larger than the corresponding user interface object is called a hidden hit region.

For example, the total hit area associated with a key icon on a keyboard may be dynamically adjusted (e.g., updated after each character in a character string is entered) with the following formula:

$$A_{Total}(i) = A_{Visible}(i) + A_{Hidden}(i) = A_{Visible}(i)\{1 + [P(i) \cdot K]\}$$

where, $A_{Total}(i)$=total hit area for the adjustable hit region for character i, $A_{Visible}(i)$=visible key area on the touch screen for character i, $A_{Hidden}(i)$=hidden hit area for character i, P(i)=probability that the next character entered will be i (where the probability is based on the previous characters entered in the character string and one or more types of word usage frequency), and K=an empirically determined, positive constant that depends on the size of the keys on the touch screen display.

For this example, the total hit area, $A_{Total}(i)$ is never less than the visible key area, $A_{Visible}(i)$. The adjustable hit region for a key icon includes a visible key area displayed on the touch screen display and a hidden hit region not displayed on the touch screen display. In some embodiments, the visible key area $A_{Visible}(i)$ for a given key is constant, while the hidden hit area $A_{Hidden}(i)$ is dynamic, thereby making the total hit area $A_{Total}(i)$ dynamic as well. K can be determined by trial and error by observing users interacting with a particular keyboard. K approaches zero as the size of the visible keys increases on the touch screen. In other words, if the key icons become comparable to or larger than the finger contact areas on the touch screen, hidden hit regions are no longer needed to help identify the key icon that the user probably intended to hit.

Figure 8A:
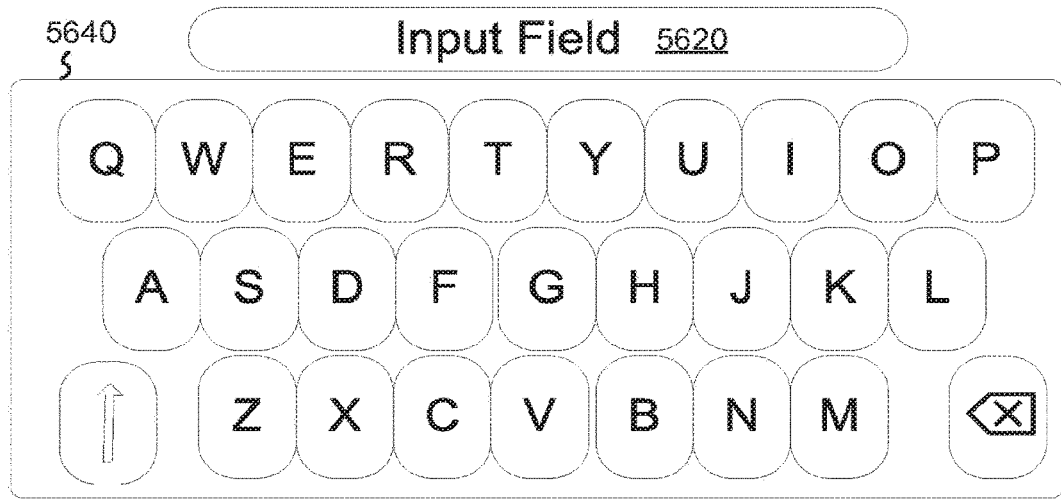
FIGS. 8A-8C illustrate an exemplary method for dynamically adjusting hidden hit regions associated with soft keyboard keys as a word is typed with the soft keyboard keys in accordance with some embodiments.
Figure 8B:
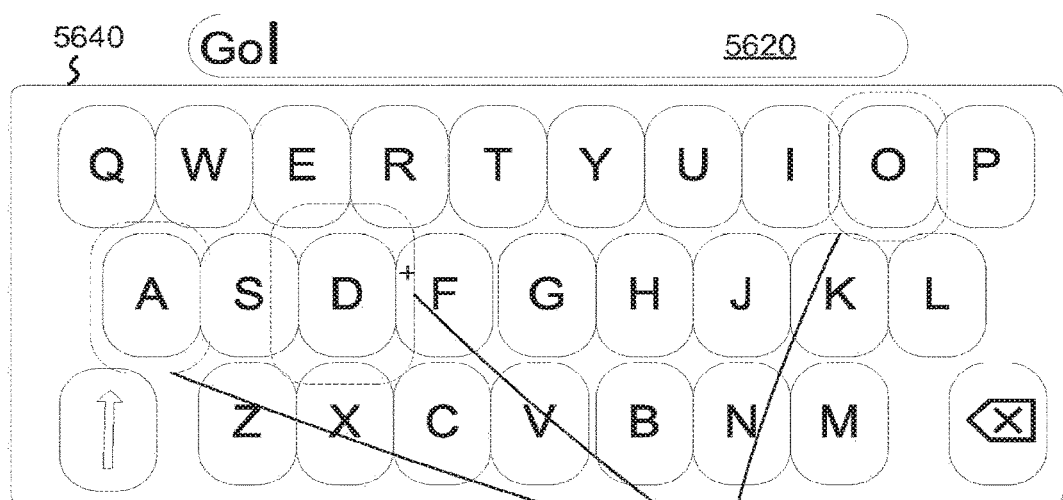
Figure 8C:
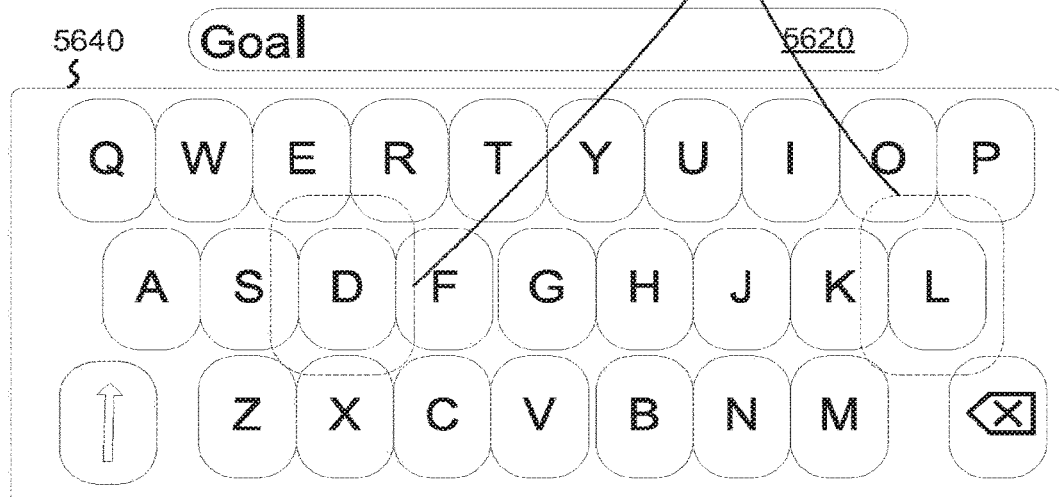

FIGS. 8A-8C illustrate an exemplary method for dynamically adjusting hidden hit regions associated with soft keyboard keys as a word is typed with the soft keyboard keys in accordance with some embodiments. The user interface includes an input field 5620 and a soft keyboard 5640. A user selection of any key icon of the soft keyboard 5640 enters a corresponding user-selected character in the input field 5620. For illustrative purposes, as shown in FIG. 8A, all the key icons initially have the same size hit regions, which correspond to the visible boundaries of the keys.

FIG. 8B depicts changes in the sizes of hidden hit regions associated with different key icons after two characters "G-O" are entered into the input field 5620. The sizes of the hidden regions for the keys have been adjusted in accordance with the previously entered characters. For example, the size of the hidden hit region for the key icon "D" increases because "God" is a common English word. Thus, the key icon "D" may be activated even if the next finger contact (as illustrated by the "+" sign in FIG. 8B) is on the visible area of the key icon "F." In some embodiments, if the hidden hit regions of two (or more) keys overlap with the finger contact (or with a touch point position derived from a finger contact), then the key with the largest hit region $A_{Total}(i)$ (including its hidden hit region $A_{Hidden}(i)$) is selected. Similarly, the hidden hit regions associated with key icons "A" and "O" are also increased because each of the strings "Goa" and "Goo" leads to one or more legitimate English words such as "Goal", "Good", or "Goad." In some embodiments, the hit regions of unlikely next characters (e.g., key icon "K" is unlikely because the string "Gok" is not found at the beginning of any common English words) shrink so that the hit area is less than the visible area of the key. In some embodiments, the hit regions of unlikely next characters do not shrink. Such keys will not be selected in the areas where they overlap with keys with enlarged hit regions.

FIG. 8C depicts the updated hidden hit regions associated with different key icons after another character "a" is entered into the input field 5620. Given the string "Goa" that has been entered, the user may be typing the word "Goal." Accordingly, the size of the hidden hit region associated with the key icon "L" increases, whereas the hidden hit region associated with the key icon "O" drops (e.g., to it default initial value) because the string "Goao" is not found at the beginning of any common English words.

FIG. 9 illustrates an exemplary derivation of candidate words based on text input in accordance with some embodiments. A set of key icons (e.g., soft keyboard 5640, FIG. 8A) are displayed on a touch screen display, as discussed above. A first touch point input is received from the user, and is construed by the portable electronic device as the character "R," because the probability of the character "R" is determined to be greater than the probability of other characters, such as "T," based on the location of the first touch point input. For example, the first touch point may be on a key icon for the letter "R." Alternately, the first touch point may be at a location that is between the key icons for the letters "R" and "T," but closer to the letter "R." With only a single touch point input so far, the probabilities are determined based solely or primarily on touch probabilities.

Figure 11A:
FIGS. 11A and 11B illustrate an exemplary user interface for inputting text in accordance with some embodiments.
Figure 11B:
Figure 12:
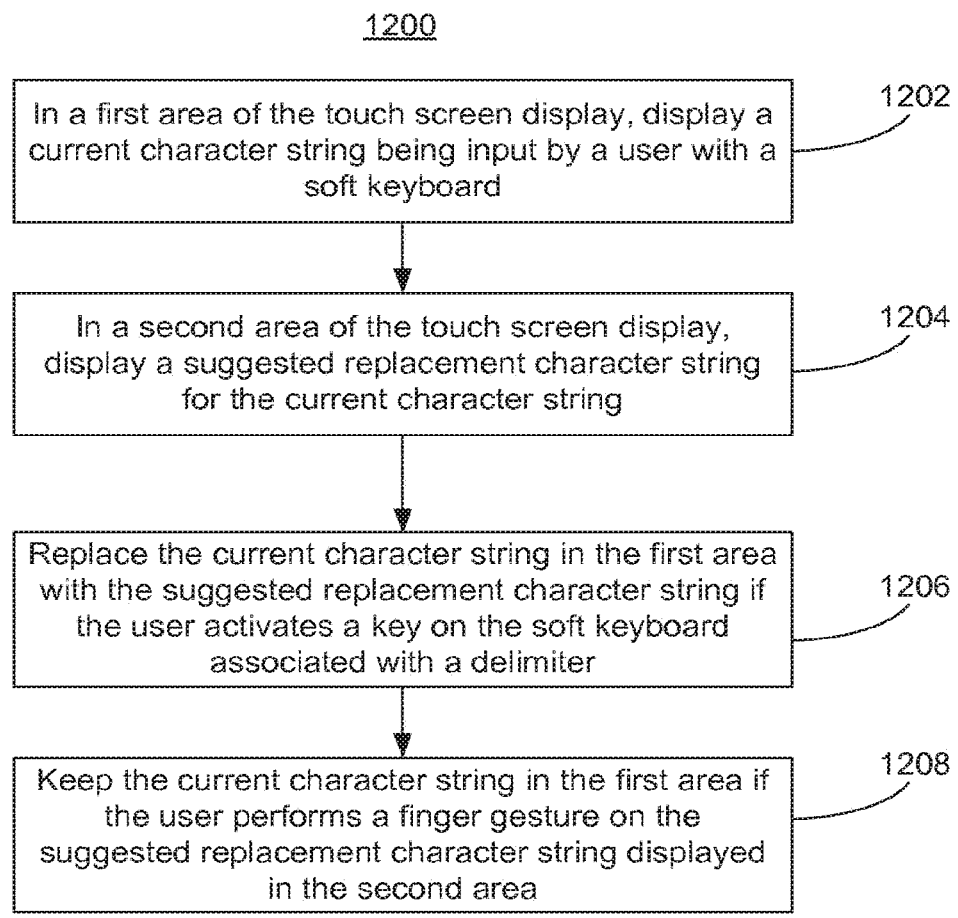
FIG. 12 is a flow diagram illustrating a process for inputting text on a portable electronic device with a soft keyboard and a touch screen display in accordance with some embodiments.

Next, a second touch point input is received from the user, this time within the hit region for the key icon for the letter "h". The device now evaluates both touch-based probabilities ($P_{touch}(r)$, $P_{touch}(h)$), for candidate characters corresponding to the first and second touch point inputs and usage-based probabilities ($P_{usage}(r)$, $P_{usage}(h)$) for the first and second touch point inputs. A combined probability for each of a plurality of candidate character sequences (e.g., Rh, Th) is determined. If there is a candidate character sequence having a probability that is greater than the probability for the displayed character sequence, and that meets any other applicable selection criteria, then a suggested character string corresponding to the candidate character sequence having the highest probability is displayed. If the displayed suggested character string (e.g., a word) is selected by the user, for example by touching the space bar or other delimiter icon (e.g., as shown in FIGS. 11A, 11B, and 12), the displayed suggested character string replaces the previously displayed sequence of characters. If the user does not select (e.g., does not touch an icon for a delimiter) the displayed suggested character string, the user can instead continue to input additional touch points. In the example shown in FIG. 9, the third touch point input is on or near the key icon for the letter "e." At this point, the device may determine that the probability for the candidate character sequence "T-h-e" [e.g., $P_{touch}(t)P_{usage}(t)P_{touch}(h)P_{usage}(h) P_{touch}(e)P_{usage}(e)$, FIG. 9] is greater than the probability for the currently displayed character sequence, "R-h-e" [e.g., $P_{touch}(r)P_{usage}(r)P_{touch}(h)P_{usage}(h)\ P_{touch}(e)P_{usage}(e)$, FIG.

9], and is also greater than the probability for any other candidate character sequence that is compatible with the sequence of touch point inputs received so far. In that case, the suggested character string "The" is displayed and made available for selection by the user. If the user is actually trying to type the word "rhesus," then in response to detecting a user touch point on or near the "s" icon key, the device will cease to display the suggested word "The." On the other hand, in response to detecting a user touch point on or near the space bar or other delimiter icon key, the device will replace "Rhe" with the suggested word "The."

Figure 10B:
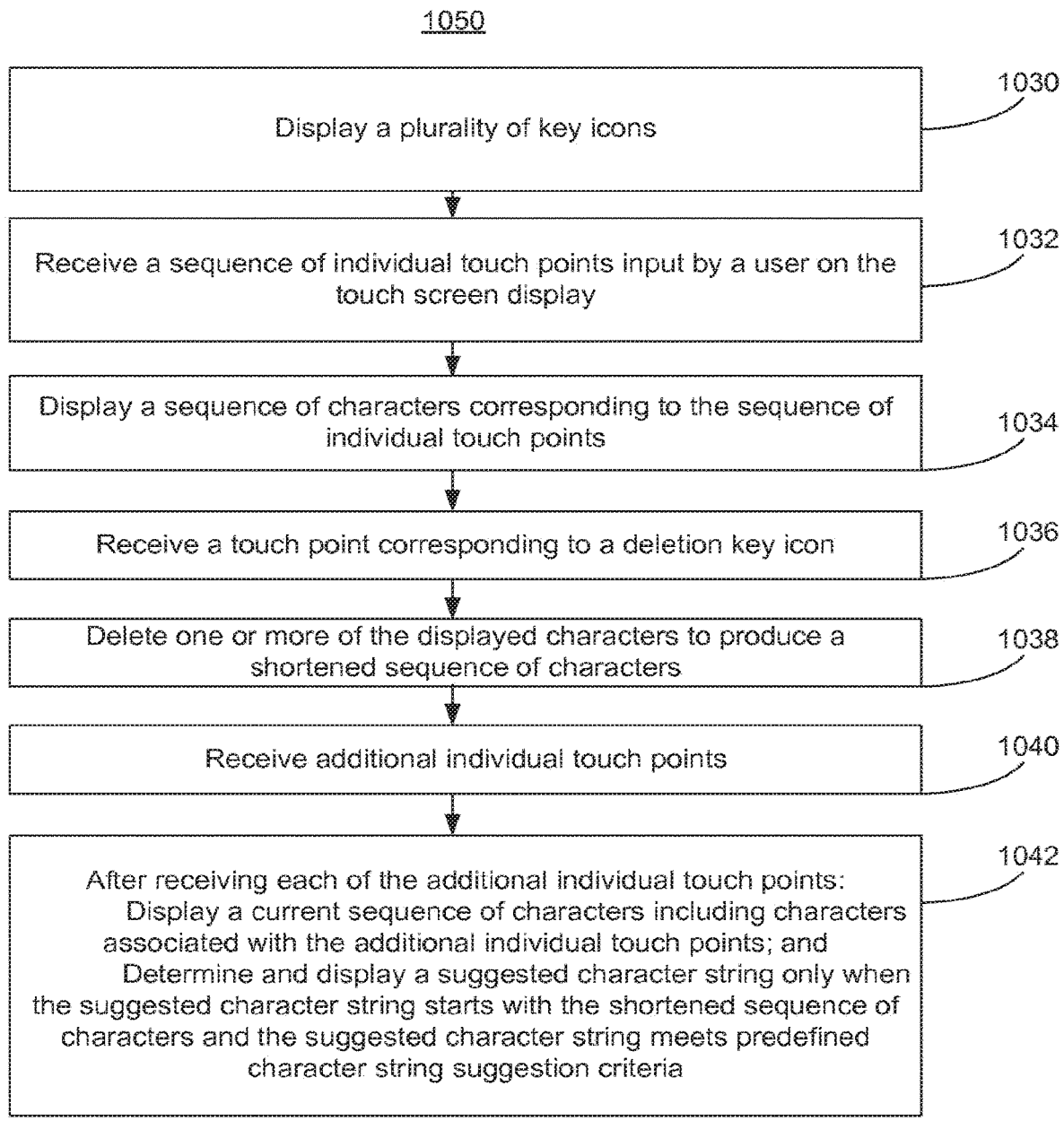

FIGS. 10A and 10B are flow diagrams illustrating text input processes 1000 and 1050 in accordance with some embodiments. The processes increase the accuracy of text entered on touch screen keyboards by touch input and the accuracy of suggested words, respectively. Process 1000 is performed at a portable electronic device having a touch screen display (e.g., device 100).

The device displays (1002) a plurality of key icons (e.g., in keyboard 5640, FIG. 8A), each key icon having an adjustable hit region of dynamically adjustable size (e.g., FIGS. 8B-8C). In some embodiments, the hit region of each key icon has a default size equal to a visible display size of the key icon (e.g., FIG. 8A).

The devices receives (1004) a sequence of individual touch points input by a user on the touch screen display. Each touch point is determined at lift off of a contact (e.g., a finger contact or a stylus contact) from the touch screen display. An image with an enlarged version of a character that will be selected as the character corresponding to an individual touch point is displayed prior to lift off of a respective contact (e.g., the letter "N" in FIG. 11A). The character image that is displayed prior to lift off is selected in accordance with the adjustable hit regions of the displayed key icons. For example, if the hidden hit regions of two (or more) keys overlap with the finger contact (or with a touch point position derived from a finger contact), then a character image that corresponds to the key with the largest hit region $A_{Total}(i)$ (including its hidden hit region $A_{Hidden}(i)$) is selected for display.

After receiving each of the individual touch points, the device:
forms a user-input directed graph for the sequence of individual touch points received so far;
determines a character corresponding to a last received individual touch point in accordance with the adjustable hit regions of the displayed key icons;
displays a sequence of characters corresponding to the sequence of individual touch points, including the determined character; and
updates sizes of the adjustable hit regions for a plurality of the key icons (1006).

As noted above, in some embodiments, if the hidden hit regions of two (or more) keys overlap with a finger contact (or with a touch point position derived from the finger contact), then the character corresponding to the key with the largest hit region (including its hidden hit region) is selected as the determined character.

In some embodiments, the device determines (1008) one of more alternate sequences of characters corresponding to the sequence of individual touch points, and determines a respective probability for each of the alternate sequences of characters and for the displayed sequence of characters. In some embodiments, the device displays a suggested replacement character string comprising a selected one of the alternate sequence of characters when the probability of the selected alternate sequence meets one or more predefined criteria with respect to the probability of the displayed sequence of characters [e.g., in FIG. 9, $P_{touch}(t)P_{usage}(t)P_{touch}(h)P_{usage}(h)P_{touch}(e)P_{usage}(e) > P_{touch}(r)P_{usage}(r)P_{touch}(h)P_{usage}(h)P_{touch}(e)P_{usage}(e)$].

In some embodiments, the device receives (1010) a touch point corresponding to a deletion key icon; deletes one or more of the displayed characters to produce a shortened sequence of characters; receives additional individual touch points; and after receiving each of the additional individual touch points: determines and displays a suggested character string only when the suggested character string starts with the shortened sequence of characters and the suggested character string meets predefined character string suggestion criteria (1010).

In some embodiments, the size of the adjustable hit region for a respective key icon is updated in accordance with the sequence of individual touch points input by the user. In some embodiments, updating the size of the adjustable hit region for a respective key icon includes determining a probability associated with the respective key icon and determining a size of the adjustable hit region in accordance with the determined probability. In some embodiments, the probability associated with the respective key icon is determined in accordance with the displayed sequence of characters (e.g., "Go" in FIG. 8B). In some embodiments, the probability associated with the respective key icon is determined in accordance with a plurality of character sequences including the displayed sequence of characters and at least one other sequence of characters consistent with the sequence of individual touch points input by the user. For example, the probability associated with the respective key icon may be based on the displayed sequence of characters (e.g., "Go" in FIG. 8B) and the top N (where N=1, 2, 5, etc.) candidate words (e.g., God, Goal, and Good for N=3) consistent with the sequence of individual touch points input by the user.

In some embodiments, the device determines a respective probability for each of a plurality of character sequences consistent with the sequence of individual touch points input by the user. The probability associated with the respective key icon is determined in accordance with determined probabilities of the plurality of character sequences, each of which comprises a potential prefix for a next character corresponding to a next touch point input by the user.

Process 1050 is performed at a portable electronic device having a touch screen display (e.g., device 100). The process increases the accuracy of suggested words by using information derived from character deletion by a user on the character string currently being entered. In the process, in addition to meeting other predefined word suggestion criteria, a word is not suggested unless the word starts with the shortened sequence of characters that remain after a user has deleted characters from the current character string being input by the user.

The device displays (1030) a plurality of key icons (e.g., soft keyboard 5640, FIG. 8A).

The device receives (1032) a sequence of individual touch points input by a user on the touch screen display.

The device displays (1034) a sequence of characters corresponding to the sequence of individual touch points.

The device receives (1036) a touch point corresponding to a deletion key icon.

The device deletes (1038) one or more of the displayed characters to produce a shortened sequence of characters.

The device receives (1040) additional individual touch points.

After receiving each of the additional individual touch points, the device:
displays a current sequence of characters including characters associated with the additional individual touch points; and
determines and displays a suggested character string only when the suggested character string starts with the shortened sequence of characters and the suggested character string meets predefined character string suggestion criteria (1042).

In some embodiments, the device determines a respective probability for the suggested character string and for the current sequence of characters. The predefined character string suggestion criteria include a requirement that the determined probability for the suggested character string be greater than the determined probability for the current sequence of characters.

In some embodiments, the predefined character string suggestion criteria include a requirement that the determined probability for the suggested character string be greater than the determined probability for the current sequence of characters by at least a predefined margin. For example, the margin may be a 10% margin, requiring that the probability for the suggested character string is at least 10% greater than the probability for the current sequence of characters.

In some embodiments, the determined probabilities are determined in accordance with the additional individual touch points input by the user.

In some embodiments, the determined probabilities are determined in accordance with the shortened sequence of characters and the additional individual touch points input by the user.

In some embodiments, the suggested character string comprises a complete word.

In some embodiments, the suggested character string comprises a complete word that includes at least one character not currently included in the plurality of displayed key icons. For example, if the user enters the letters "bete," the suggested word may be "bête." The suggested word includes "ê", which may not be displayed on a key icon on the keyboard.

FIGS. 11A and 11B illustrate an exemplary user interface for inputting text in accordance with some embodiments.

In some embodiments, user interfaces 1100A and 1100B include the following elements, or a subset or superset thereof:
Signal strength indicator(s) 650 for wireless communication (s), such as cellular and Wi-Fi signals;
Time 652;
Battery status indicator 654;
Text entry area 612;
Send icon 614 that when activated (e.g., by a finger tap on the icon) initiates sending of the message in text box 612 to another party (e.g., Mike Van Os);
Soft keyboard 616 for entering text in area 612;
Alternate keyboard selector icon 618 that when activated (e.g., by a finger tap on the icon) initiates the display of a different keyboard (e.g., a soft keyboard with numbers);
Return icon 620 that when activated (e.g., by a finger tap on the icon) initiates a new line in the message in text box 612;
Shift key 628 that when activated (e.g., by a finger tap on the icon) capitalizes the next letter chosen on soft keyboard 616
Recipient input field 632 that when activated (e.g., by a finger tap on the field) receives and displays the phone number of the recipient of the instant message (or the recipient's name if the recipient is already in the user's contact list);
Add recipient icon 634 that when activated (e.g., by a finger tap on the icon) initiates the display of a scrollable list of contacts;
Cancel icon 636 that when activated (e.g., by a finger tap on the icon) cancels the new instant message;
Second area with suggested word 644 (e.g., adjacent to the word being input in text entry area 612);
Rejection icon 645;
Space bar 646; and/or
Insertion marker 656 (e.g., a cursor, insertion bar, insertion point, or pointer).

In some embodiments, a user can set whether the second area 644 with a suggested word is shown (e.g., by setting a user preference). In some embodiments, a letter is enlarged briefly before or after it is selected (e.g., an enlarged "N" 660 is displayed briefly while typing the "n" in "din" in FIG. 11A) to provide feedback to the user.

FIG. 12 is a flow diagram illustrating a process 1200 for inputting text on a portable electronic device with a soft keyboard and a touch screen display (e.g., device 100) in accordance with some embodiments. The process makes it very simple and intuitive for a user to accept or reject suggested words.

In a first area (e.g., text entry area 612) of the touch screen display, the device displays (1202) a current character string being input by a user with the soft keyboard (e.g., "din", FIG. 11A).

In a second area 644 of the touch screen display, the device displays (1204) a suggested replacement character string for the current character string (e.g., "dinner" in area 644, FIG. 11A). In some embodiments, the second area 644 includes a suggestion rejection icon 645 adjacent to the suggested replacement character string (e.g., the circled "X" in area 644 adjacent to "dinner").

The device replaces (1206) the current character string in the first area with the suggested replacement character string in response to detecting user activation of a key on the soft keyboard associated with a delimiter. For example, if the user activates the space bar key 646 on keyboard 615, the character string "din" in area 612 is replaced with the suggested replacement character string "dinner," as shown in FIG. 11B.

The device keeps (1208) the current character string in the first area in response to detecting a finger gesture on the suggested replacement character string displayed in the second area (e.g., a tap gesture on the suggested replacement character string "dinner" ends display of the suggested replacement character string "dinner" and the suggestion rejection icon 645, while the current character string "din" is kept in area 612, not shown).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:
1. A portable electronic device, comprising:
a touch-sensitive surface;
a display;
one or more processors; and memory storing one or more programs configured to be executed by the one or more processors, the one or more programs including instructions for:
displaying, on the display, a plurality of key icons;
receiving, via the touch-sensitive surface, a first gesture;
displaying, on the display, a sequence of characters corresponding to the first gesture;
receiving, via the touch-sensitive surface, a second gesture corresponding to a deletion key icon;
deleting one or more of the displayed sequence of characters to produce a shortened sequence of characters;
receiving, via the touch-sensitive surface, a third gesture; and
after receiving the third gesture:
displaying, on the display, a current sequence of characters including characters associated with the third gesture; and
determining a suggested character string based on the shortened sequence of characters and on information derived from the deleted one or more of the displayed sequence of characters, wherein the suggested character string starts with the shortened sequence of characters and the suggested character string comprises at least one character not included in the plurality of key icons;
in accordance with a determination that a display suggested word setting is enabled:
in accordance with a determination that a respective probability for the suggested character string is greater than or equal to a probability for the current sequence of characters, displaying, on the display, a suggestion area with the suggested character string; and
in accordance with a determination that the respective probability for the suggested character string is less than the probability for the current sequence of characters, displaying, on the display, the suggestion area without the suggested character string; and
in accordance with a determination that the display suggested word setting is disabled, forgoing display of the suggestion area on the display.

2. The electronic device of claim 1, wherein the determination that the respective probability for the suggested character string is less than the probability for the current sequence of characters includes a predefined threshold margin.

3. The electronic device of claim 1, wherein the determination that the respective probability for the suggested character string i greater than or equal to the probability for the current sequence of characters includes a predefined threshold margin.

4. The electronic device of claim 1, wherein the respective probabilities are determined in accordance with the third gesture.

5. The electronic device of claim 1, wherein the respective probabilities are determined in accordance with the shortened sequence of characters and the third gesture.

6. The electronic device of claim 1, wherein the suggested character string comprises a complete word.

7. The electronic device of claim 1, wherein the suggested character string comprises a complete word that includes at least one character not included in the plurality of displayed key icons.

8. The electronic device of claim 1, wherein the suggested character string comprises a complete word based at least in part on usage frequency of the complete word.

9. A non-transitory computer-readable storage medium storing one or more programs configured to be executed by one or more processors of an electronic device with a display and a touch-sensitive surface, the one or more programs including instructions for:
displaying, on the display, a plurality of key icons;
receiving, via the touch-sensitive surface, a first gesture;
displaying, on the display, a sequence of characters corresponding to the first gesture;
receiving, via the touch-sensitive surface, a second gesture corresponding to a deletion key icon;
deleting one or more of the displayed sequence of characters to produce a shortened sequence of characters;
receiving, via the touch-sensitive surface, a third gesture; and
after receiving the third gesture:
displaying, on the display, a current sequence of characters including characters associated with the third gesture; and
determining a suggested character string based on the shortened sequence of characters and on information derived from the deleted one or more of the displayed sequence of characters, wherein the suggested character string starts with the shortened sequence of characters and the suggested character string comprises at least one character not included in the plurality of key icons;
in accordance with a determination that a display suggested word setting is enabled:
in accordance with a determination that a respective probability for the suggested character string is greater than or equal to a probability for the current sequence of characters, displaying, on the display, a suggestion area with the suggested character string; and
in accordance with a determination that the respective probability for the suggested character string is less than the probability for the current sequence of characters, displaying, on the display, the suggestion area without the suggested character string; and
in accordance with a determination that the display suggested word setting is disabled, forgoing display of the suggestion area on the display.

10. The non-transitory computer-readable storage medium of claim 9, wherein the
determination that the respective probability for the suggested character string is less than the probability for the current sequence of characters includes a predefined threshold margin.

11. The non-transitory computer-readable storage medium of claim 9, wherein the determination that the respective probability for the suggested character string is greater than or equal to the probability for the current sequence of characters includes a predefined threshold margin.

12. The non-transitory computer-readable storage medium of claim 9, wherein the respective probabilities are determined in accordance with the third gesture.

13. The non-transitory computer-readable storage medium of claim 9, wherein the respective probabilities are determined in accordance with the shortened sequence of characters and the third gesture.

14. The non-transitory computer-readable storage medium of claim 9, wherein the suggested character string comprises a complete word.

15. The non-transitory computer-readable storage medium of claim 9, wherein the suggested character string comprises a complete word that includes the at least one character not included in the plurality of displayed key icons.

16. The non-transitory computer-readable storage medium of claim 9, wherein the suggested character string comprises a complete word based at least in part on usage frequency of the complete word.

17. A computer-implemented method, comprising:
at an electronic device with a display and a touch-sensitive surface:
displaying, on the display, a plurality of key icons;
receiving, via the touch-sensitive surface, a first gesture;
displaying, on the display, a sequence of characters corresponding to the first gesture;
receiving, via the touch-sensitive surface, a second gesture corresponding to a deletion key icon;
deleting one or more of the displayed sequence of characters to produce a shortened sequence of characters;
receiving, via the touch-sensitive surface, a third gesture; and
after receiving the third gesture:
displaying, on the display, a current sequence of characters including characters associated with the third gesture; and
determining a suggested character string based on the shortened sequence of characters and on information derived from the deleted one or more of the displayed sequence of characters, wherein the suggested character string starts with the shortened sequence of characters and the suggested character string comprises at least one character not included in the plurality of key icons;
in accordance with a determination that a display suggested word setting is enabled:
in accordance with a determination that a respective probability for the suggested character string is greater than or equal to a probability for the current sequence of characters, displaying, on the display, a suggestion area with the suggested character string; and
in accordance with a determination that the respective probability for the suggested character string is less than the probability for the current sequence of characters, displaying, on the display, the suggestion area without the suggested character string; and
in accordance with a determination that the display suggested word setting is disabled, forgoing display of the suggestion area on the display.

18. The method of claim 17, wherein the determination that the respective probability for the suggested character string is less than the probability for the current sequence of characters includes a predefined threshold margin.

19. The method of claim 17, wherein the determination that the respective probability for the suggested character string is greater than or equal to the probability for the current sequence of characters includes a predefined threshold margin.

20. The method of claim 17, wherein the respective probabilities are determined in accordance with the third gesture.

21. The method of claim 17, wherein the respective probabilities are determined in accordance with the shortened sequence of characters and the third gesture.

22. The method of claim 17, wherein the suggested character string comprises a complete word.

23. The method of claim 17, wherein the suggested character string comprises a complete word that includes the at least one character not included in the plurality of displayed key icons.

24. The method of claim 17, wherein the suggested character string comprises a complete word based at least in part on usage frequency of the complete word.

* * * * *

UNITED STATES PATENT AND TRADEMARK OFFICE
CERTIFICATE OF CORRECTION

| | | |
|---|---|---|
| PATENT NO. | : 11,079,933 B2 | Page 1 of 1 |
| APPLICATION NO. | : 16/270396 | |
| DATED | : August 3, 2021 | |
| INVENTOR(S) | : Kenneth Kocienda et al. | |

It is certified that error appears in the above-identified patent and that said Letters Patent is hereby corrected as shown below:

In the Claims

Claim 3, Column 23, Line 53, delete "i greater" and insert -- is greater --, therefor.

Signed and Sealed this
Eighteenth Day of January, 2022

Drew Hirshfeld
*Performing the Functions and Duties of the*
*Under Secretary of Commerce for Intellectual Property and*
*Director of the United States Patent and Trademark Office*